(12) United States Patent
Chujo et al.

(10) Patent No.: US 9,514,315 B2
(45) Date of Patent: Dec. 6, 2016

(54) INFORMATION PROCESSING SYSTEM AND CONTROL METHOD OF INFORMATION PROCESSING SYSTEM

(71) Applicant: FUJITSU LIMITED, Kawasaki-shi, Kanagawa (JP)

(72) Inventors: Yoshihisa Chujo, Seto (JP); Tsuyoshi Hashimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 64 days.

(21) Appl. No.: 14/522,709

(22) Filed: Oct. 24, 2014

(65) Prior Publication Data

US 2015/0143114 A1  May 21, 2015

(30) Foreign Application Priority Data

Nov. 15, 2013  (JP) ................................. 2013-237072

(51) Int. Cl.
*G06F 21/60* (2013.01)
*H04L 29/08* (2006.01)

(52) U.S. Cl.
CPC ......... *G06F 21/606* (2013.01); *H04L 67/1008* (2013.01)

(58) Field of Classification Search
CPC combination set(s) only.
See application file for complete search history.

(56) References Cited

U.S. PATENT DOCUMENTS 6,336,115 B1* 1/2002 Tominaga ......... G06F 17/30067
7,894,808 B2* 2/2011 Nakayama ................ G06F 8/61
    370/315
8,904,173 B2* 12/2014 Shamsaasef ............ G06F 21/10
    713/168

(Continued)

FOREIGN PATENT DOCUMENTS

JP    11-312138    11/1999
JP    2008-152783    7/2008

OTHER PUBLICATIONS

Michael D. Dahlin, et al. "Cooperative Caching: Using Remote Client Memory to Improve File System Performance", OSDI '94 Proceedings of the 1st USENIX conference on Operating Systems Design and Implementation, Article No. 19 USENIX Association Berkeley, CA, USA, 1994, pp. 1-14 (14 pages).
Kostas Magoutis, "The Optimistic Direct Access File System: Design and Network Interface Support", Proceedings of the 1st Workshop on Novel Uses of System Area Networks, 2002 (12 pages).

*Primary Examiner* — David Pearson
*Assistant Examiner* — Phy Anh Vu
(74) *Attorney, Agent, or Firm* — Fujitsu Patent Center

(57) ABSTRACT

A first information processing device holds data and a key for encryption. A second information processing device does not have rights to share data not encrypted with the first information processing device and a client. The first information processing device transmits data and key to the client when receiving a request to use the data. The first information processing device generates first encrypted data encrypted with the key, and transmits it to the second information processing device. The client transmits information obtained by encrypting the result of processing on the data with the key to the second information processing device until the use of the data ends. The first information processing device acquires second encrypted data received by the second information processing device from the second information processing device, and decrypts and stores it when notified that the use of the data has ended.

5 Claims, 19 Drawing Sheets

(56) References Cited

U.S. PATENT DOCUMENTS

| | | | |
|---|---|---|---|
| 2002/0049842 A1* | 4/2002 | Huetsch | H04L 29/06 709/225 |
| 2004/0103254 A1* | 5/2004 | Satoyama | G06F 3/0613 711/150 |
| 2006/0168451 A1* | 7/2006 | Ishibashi | G06F 21/10 713/176 |
| 2006/0174013 A1* | 8/2006 | Katsumata | H04L 43/0811 709/227 |
| 2008/0147938 A1 | 6/2008 | Freimuth et al. | |
| 2012/0054517 A1* | 3/2012 | Fuh | G06F 1/3287 713/320 |
| 2014/0095881 A1* | 4/2014 | Chan | G06F 17/30085 713/171 |

* cited by examiner

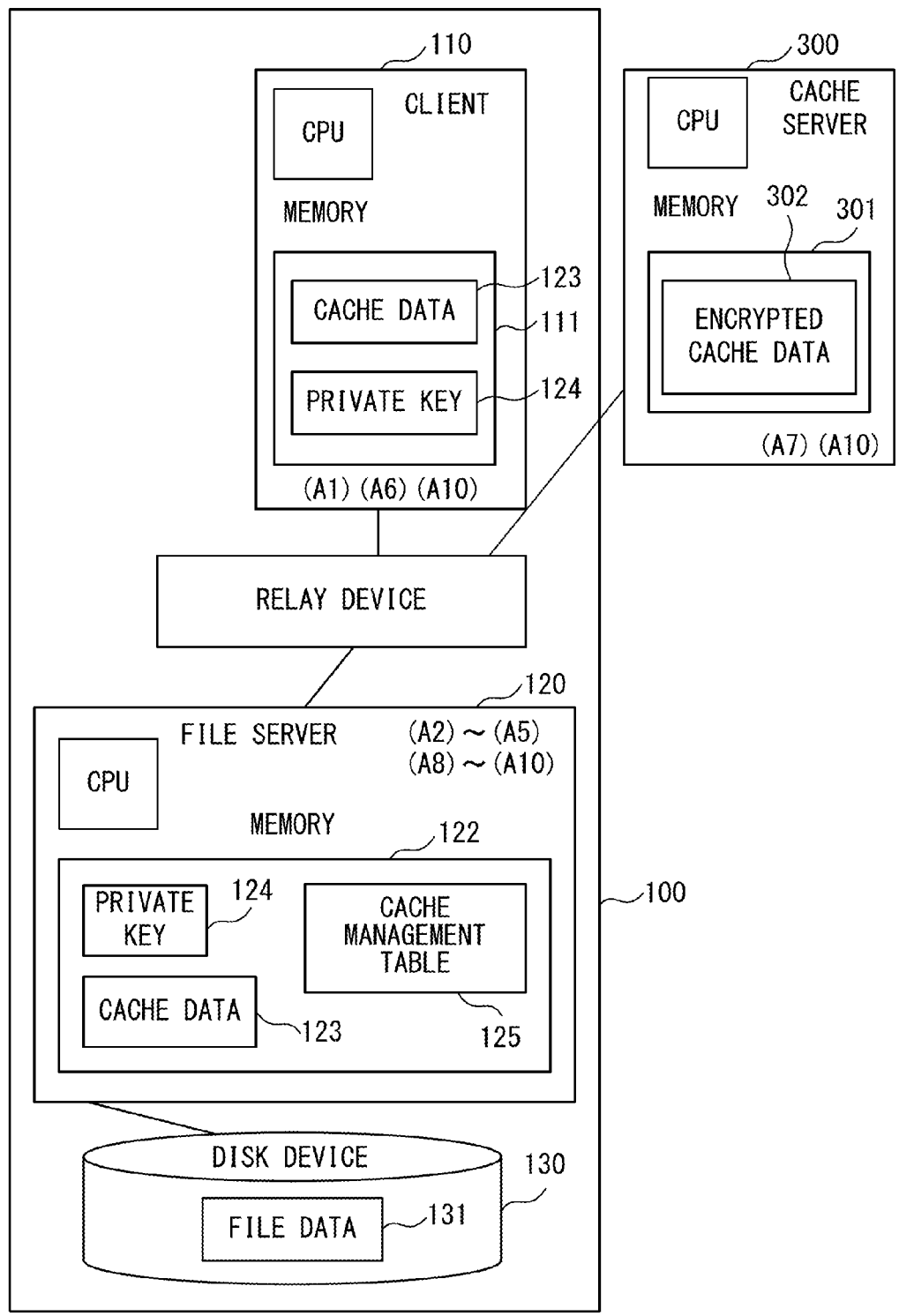
F I G. 1

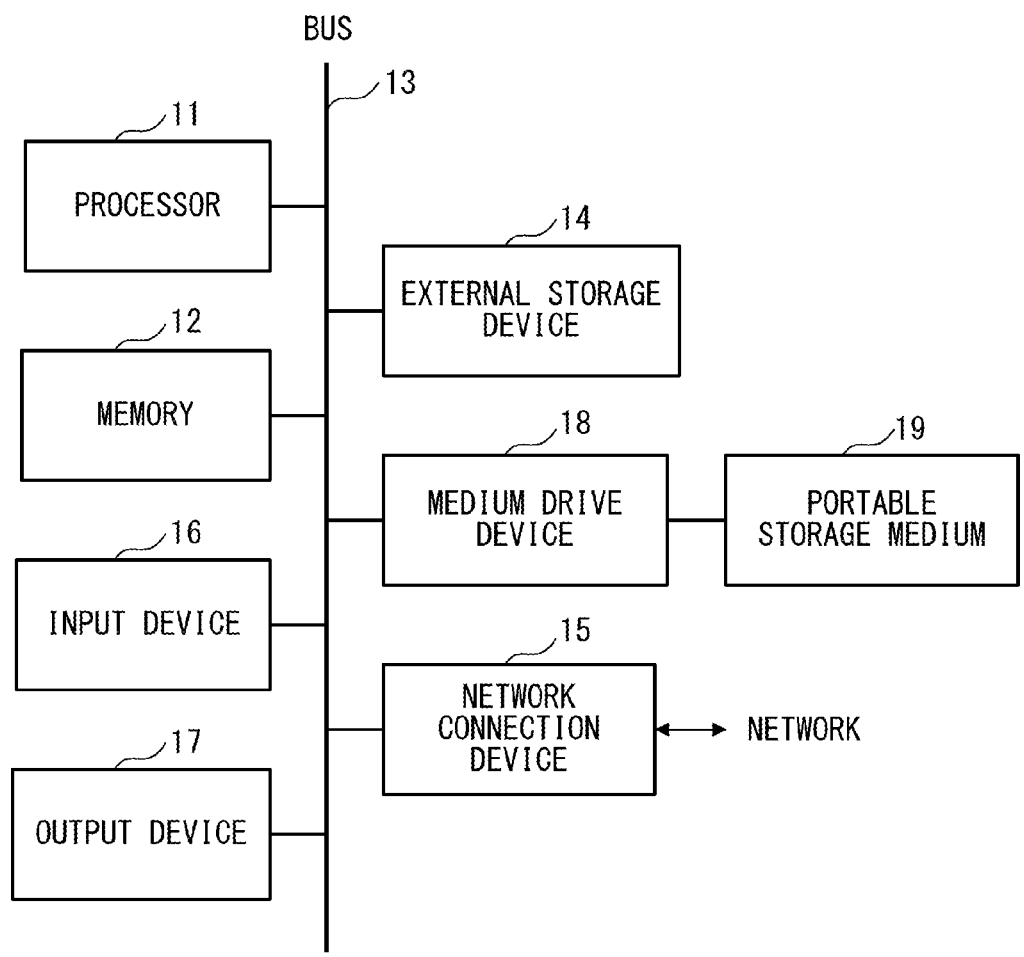
F I G. 2

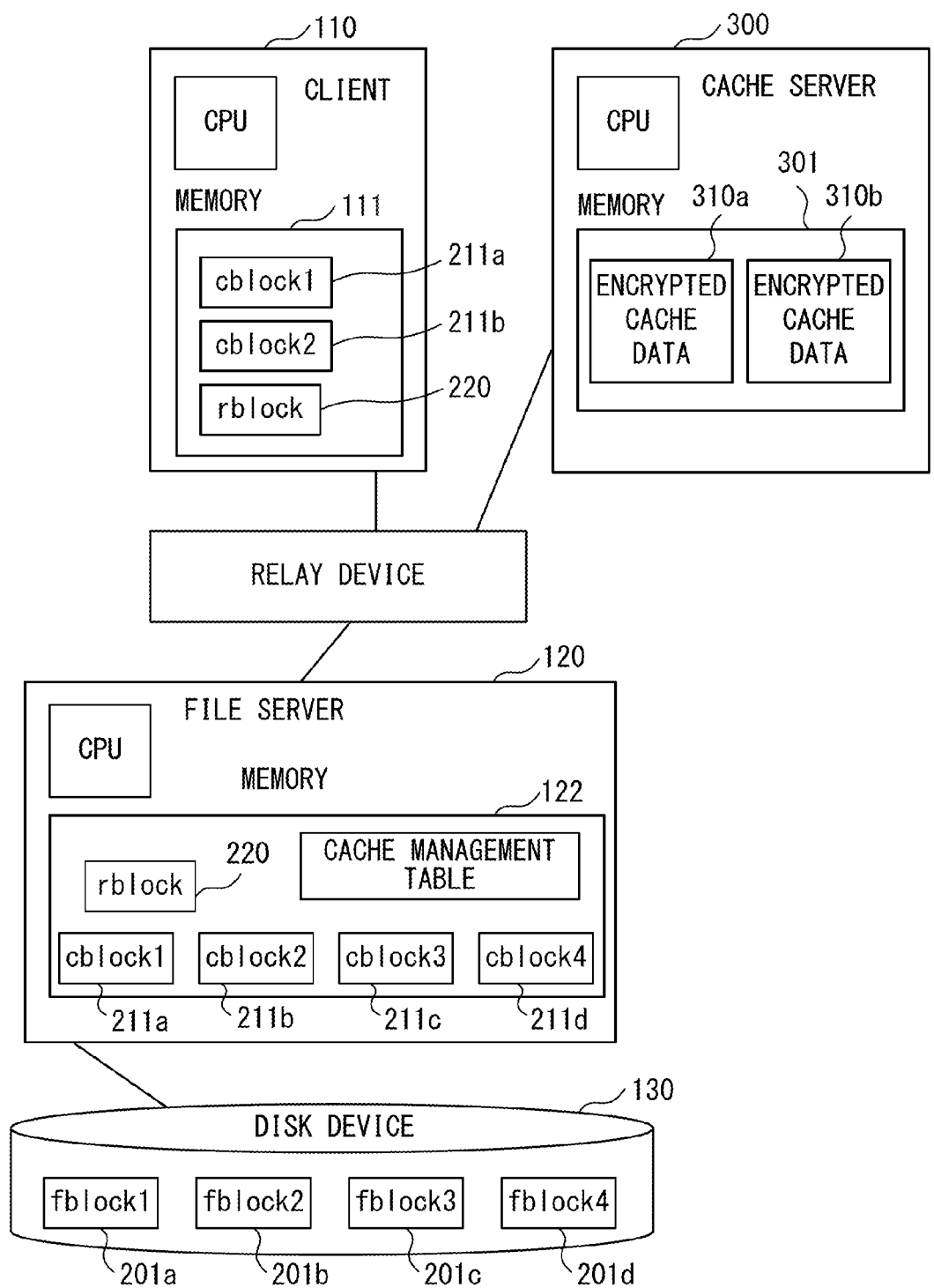
F I G. 3

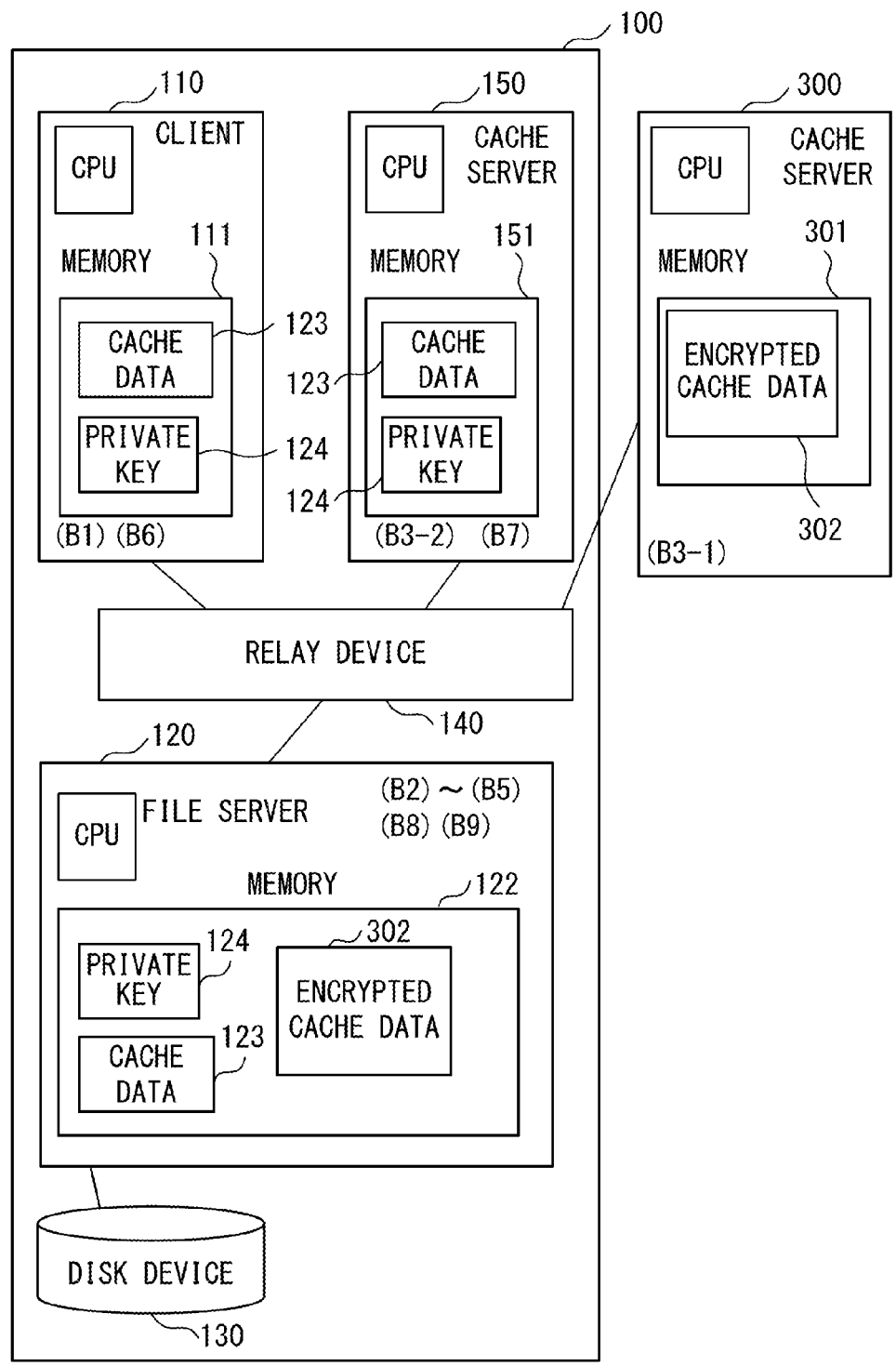
F I G. 4

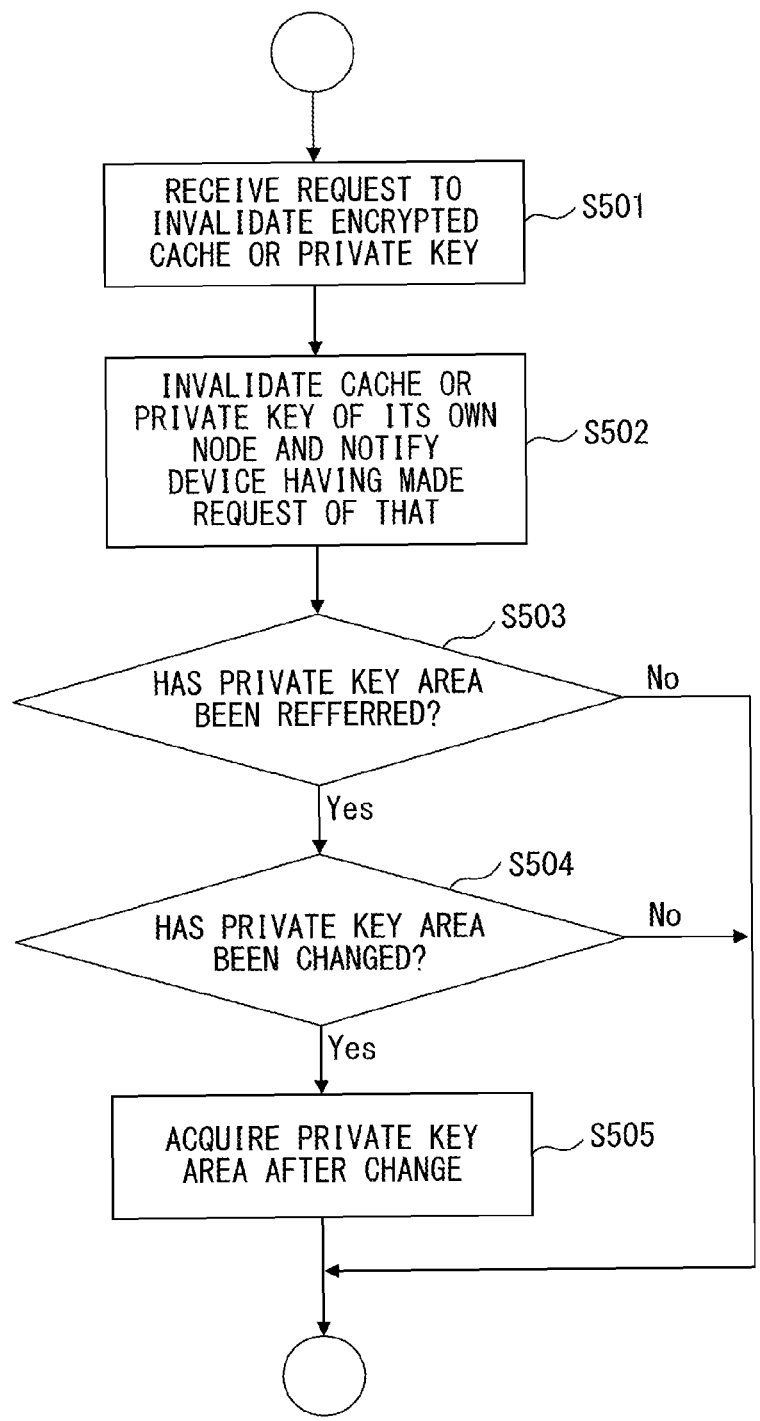
F I G. 6 C

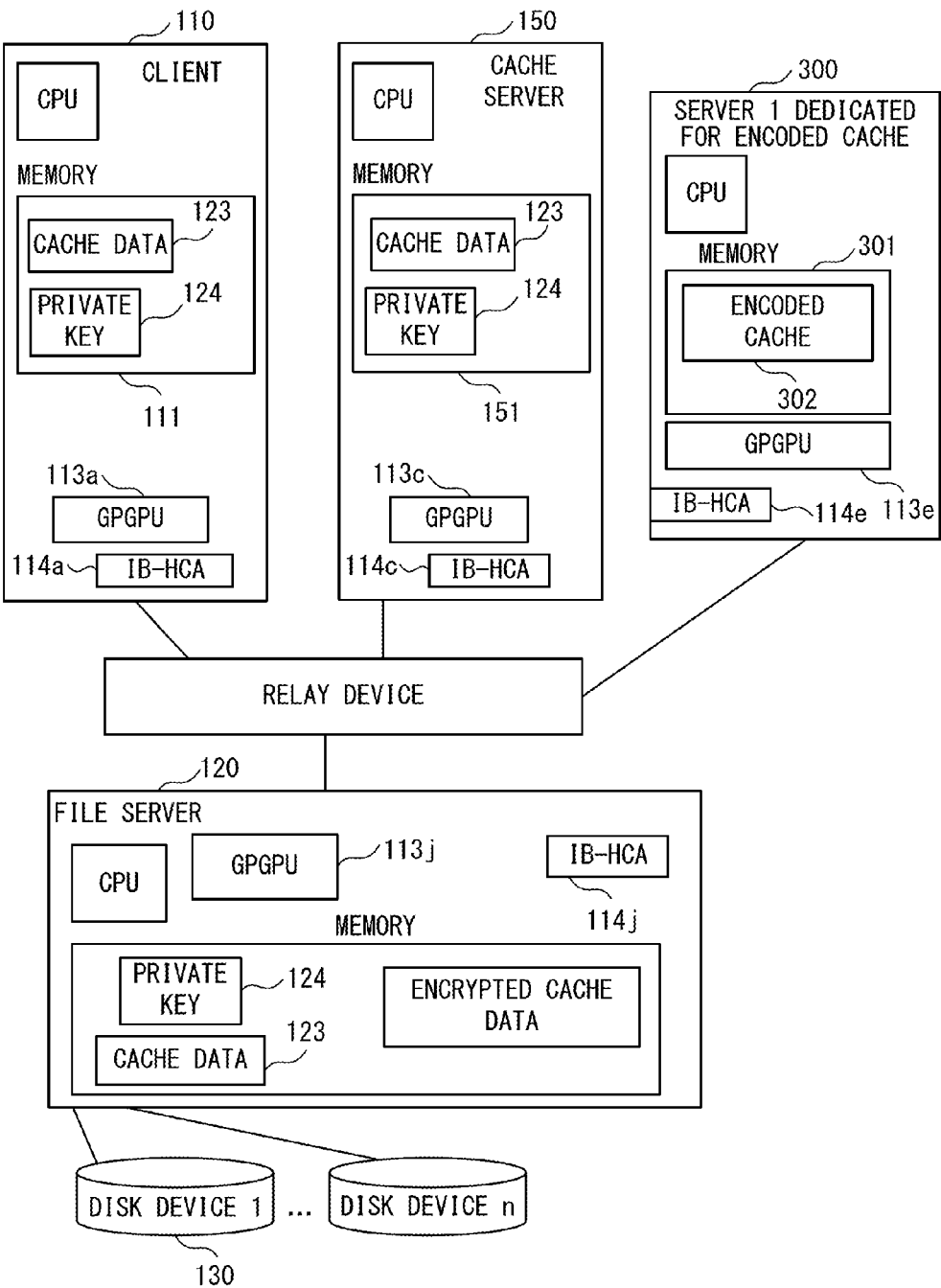
F I G. 7

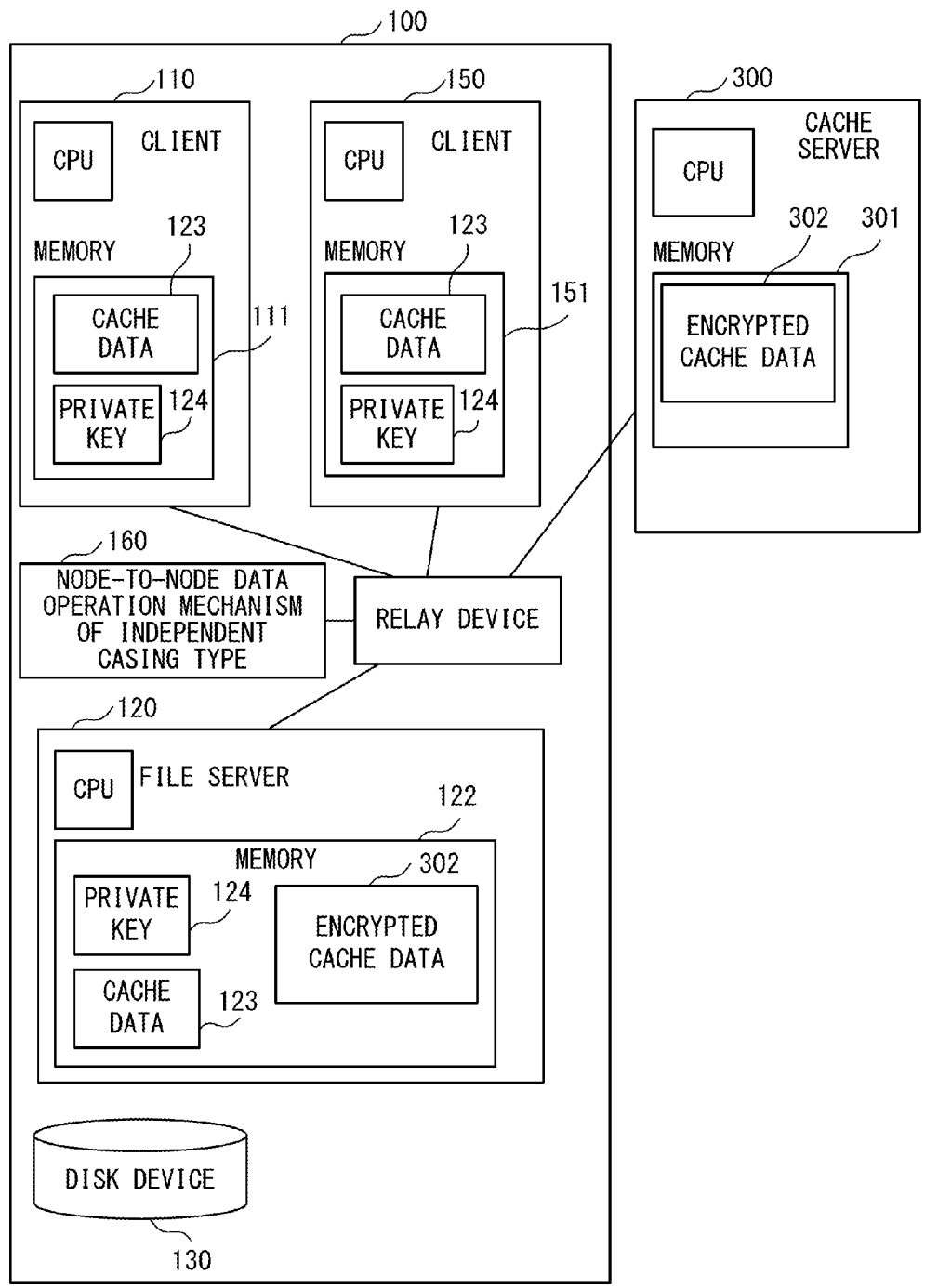
F I G. 8

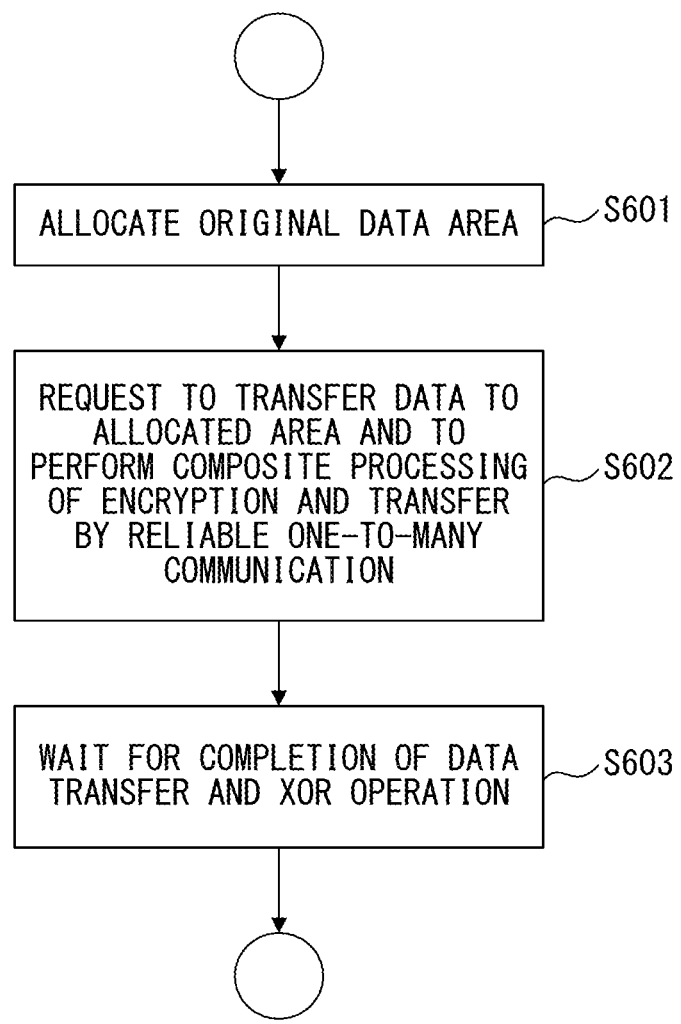
F I G. 10

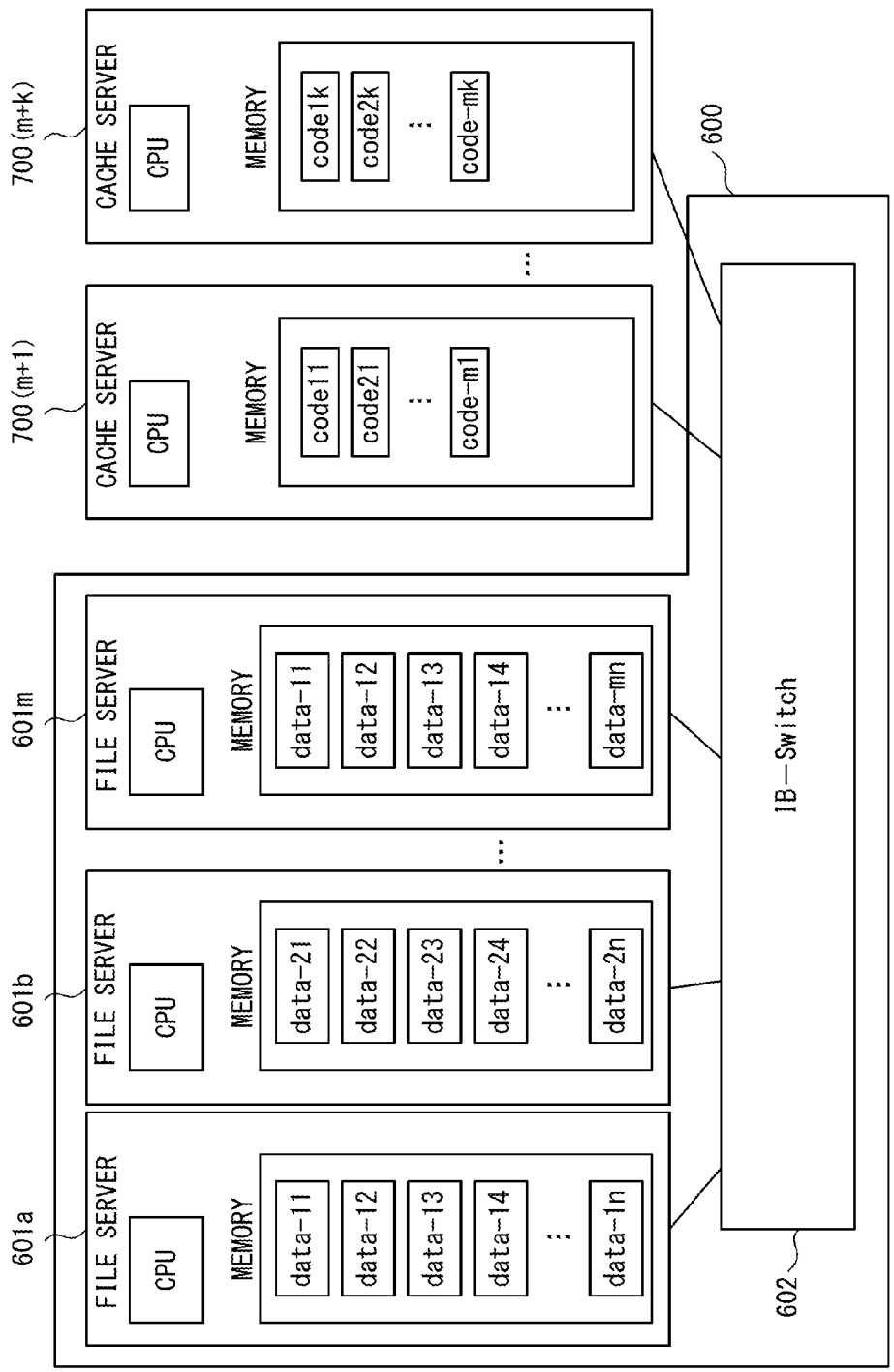

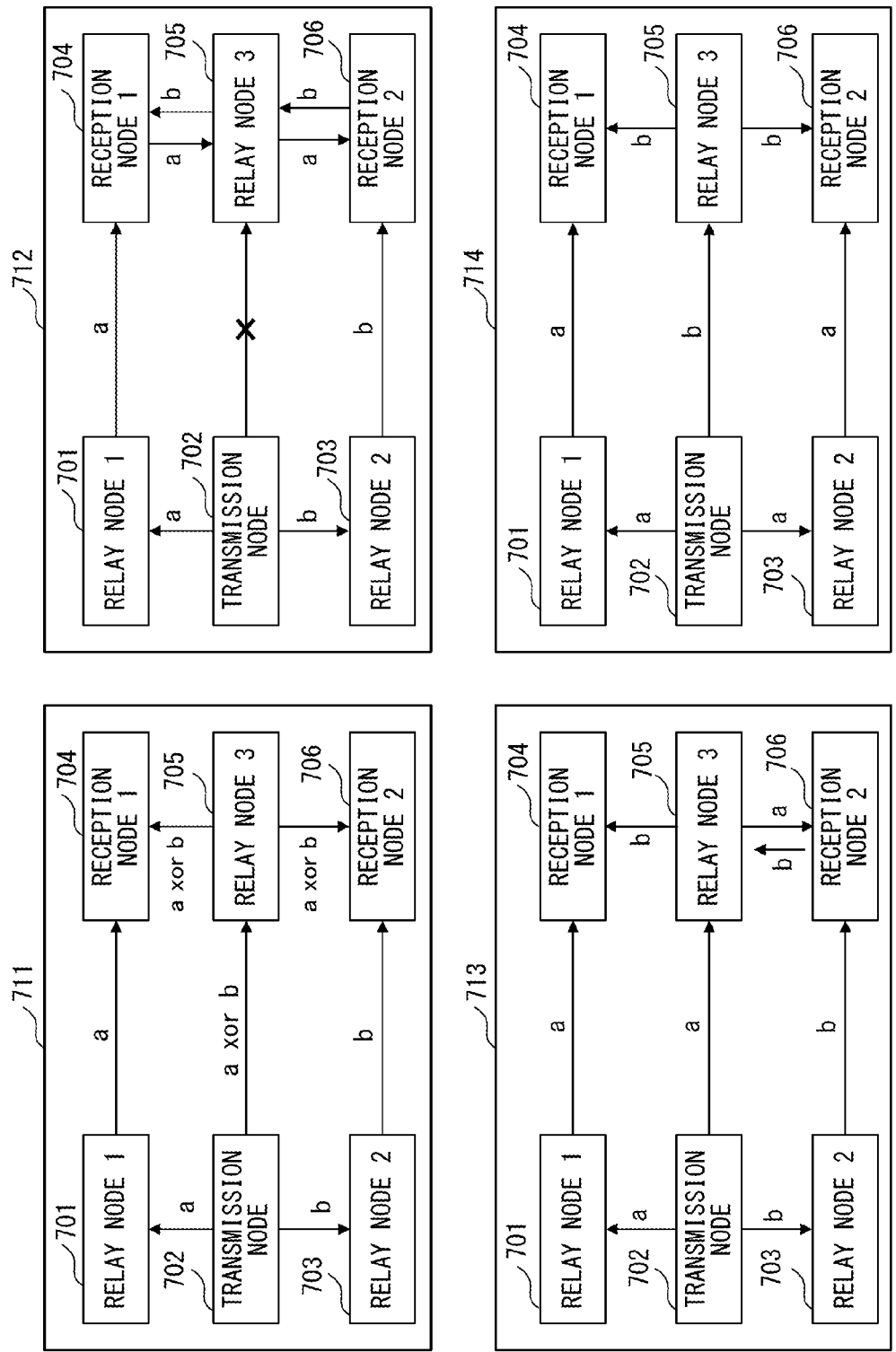
F I G. 12

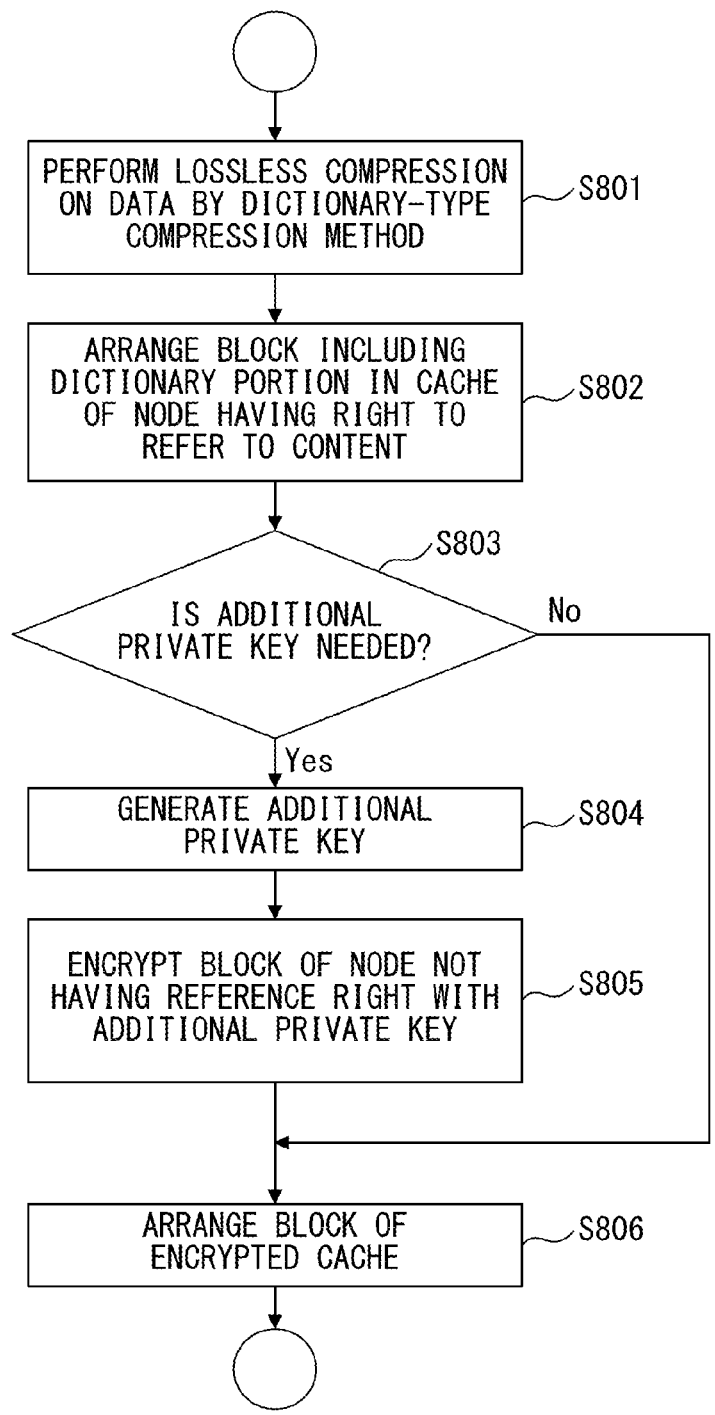
F I G. 14

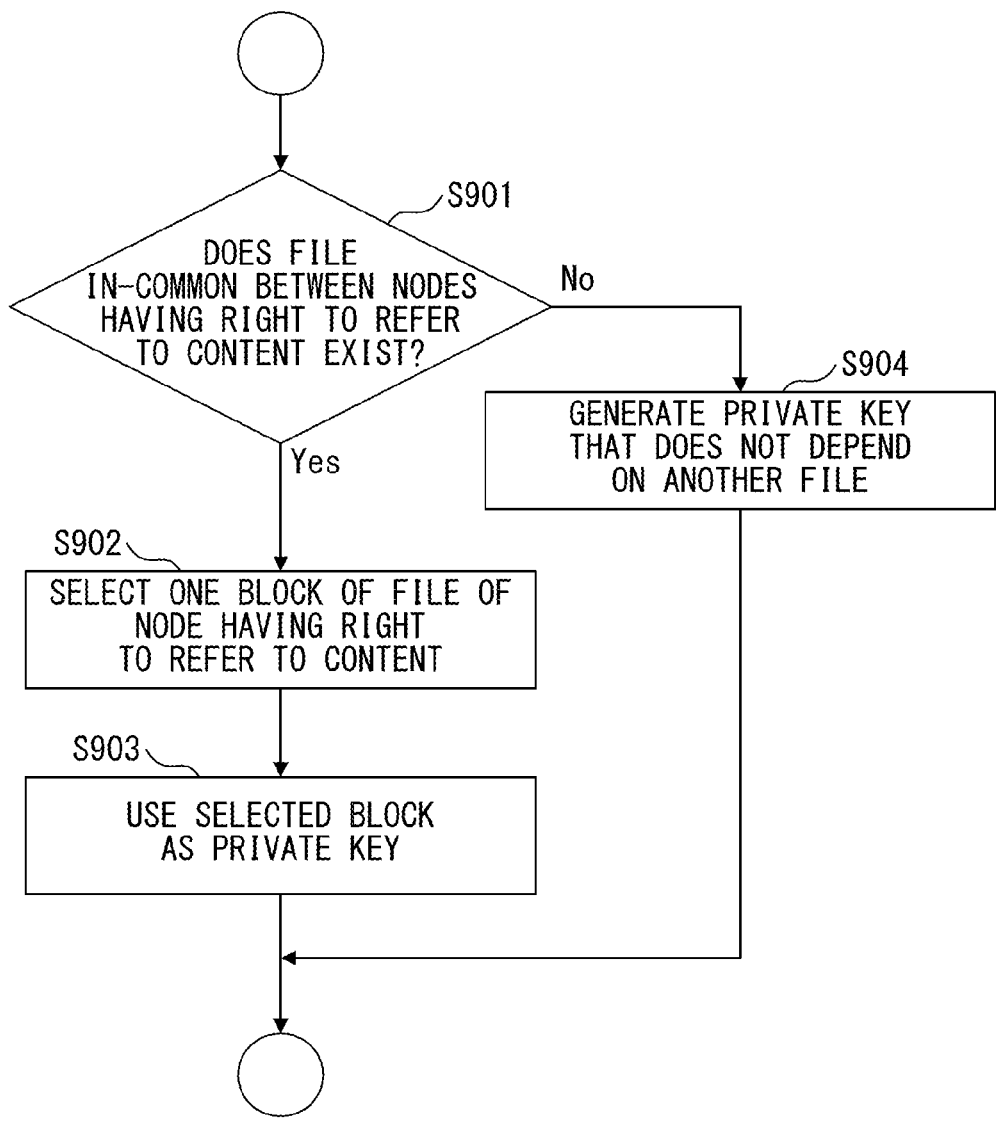
F I G. 1 5

INFORMATION PROCESSING SYSTEM AND CONTROL METHOD OF INFORMATION PROCESSING SYSTEM

CROSS-REFERENCE TO RELATED APPLICATIONS

This application is based upon and claims the benefit of priority of the prior Japanese Patent Application No. 2013-237072, filed on Nov. 15, 2013, the entire contents of which are incorporated herein by reference.

FIELD

The embodiments discussed herein are related to control of an information processing system.

BACKGROUND

A distributed file system is a system in which files are shared among a plurality of servers via a network. In a distributed file system, each client accesses a shared file via a file server. Because of this, distributed file systems have a problem such that accesses concentrate in the file server if the number of clients using the system increases. The file server is requested to have a high performance in order to process concentrated accesses.

However, introducing a high-performance server into the system is not favorable from the viewpoint of cost reduction. Because of this, a technique is known for reducing the amount of processing in the file server by distributing the load imposed on the file server.

As an example of a technique related to load distribution, a technique is known for making an attempt to reduce the load on the server by using a memory on the client side as a cache so as to increase the amount of processing on the client side (e.g., see Non-Patent document 1).

As another example of a technique related to load distribution, a technique is known for starting communication by command issuance from the client side. This technique is called, for example, RDMA (Remote Direct Memory Access). This is the technique for reducing the load accompanying issuance of a command to the NIC on the server side (e.g., see Non-Patent document 2).

As a related technique, a technique is known for performing data communication by using DMA (Direct Memory Access). Setting a shared memory so that an end point has an address range within the shared memory by establishing a transaction-oriented protocol between a host system and the end point is known (e.g., see Patent document 1).

As another related technique, it is known that each device transfers information of an interrupt factor register to the main memory by using DMA. It is known that the main storage device has an address allocated to each device in advance and the device writes DMA to the allocated address (e.g., see Patent document 2).

Patent document 1: Japanese Laid-open Patent Publication No. 2008-152783
Patent document 2: Japanese Laid-open Patent Publication No. 11-312138
Non-Patent document 1: Michael D. Dahlin, Randolph Y. Wang, Thomas E. Anderson, David A. Patterson, "Cooperative caching: using remote client memory to improve file system performance" OSDI '94 Proceedings of the 1$^{st}$ USENIX conference on Operating Systems Design and Implementation, Article No. 19 USENIX Association Berkeley, Calif., USA@1994

Non-Patent document 2: Kostas Magoutis, "The Optimistic Direct Access File System: Design and Network Interface Support", Proceedings of the 1$^{st}$ Workshop on Novel Uses of System Area Networks, 2002

SUMMARY

According to an aspect of the embodiments, an information processing system includes a client and a first and a second information processing device. The first information processing device holds data and a key used for encryption. The second information processing device does not have the right to share data that is not encrypted with the first information processing device and the client. Upon receipt of a request to use data from the client, the first information processing device transmits data and a key to the client. Further, the first information processing device generates first encrypted data, which is the data encrypted with the key, and transmits the first encrypted data to the second information processing device. The client transmits information obtained by encrypting the result of processing on the data with the key to the second information processing device until the use of the data ends. When notified by the client that the use of the data has ended, the first information processing device acquires second encrypted data, which is the most recent information that the second information processing device has received from the client, from the second information processing device, and decrypts and stores the second encrypted data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram for explaining an example (part 1) of a system according to an embodiment;

FIG. 2 is a diagram for explaining an example of a hardware configuration of a client, a file server, and a cache server;

FIG. 3 is a diagram for explaining an example of encryption processing according to the embodiment;

FIG. 4 is a diagram for explaining the example (part 2) of the system according to the embodiment;

FIG. 6C is a flowchart for explaining an example of processing related to a file data update on the client and the cache server sides;

FIG. 7 is a diagram for explaining an example of a system including a GPGPU;

FIG. 8 is a diagram for explaining the example (part 3) of the system according to the embodiment;

FIG. 10 is a flowchart for explaining an example of encryption and decryption processing using a internode operation device;

FIG. 11A is a diagram for explaining an example of a system using erasure correcting code;

FIG. 12 is a diagram for explaining an example of data transfer in a system using erasure correcting code;

FIG. 14 is a flowchart for explaining an example of encryption by a dictionary-type compression algorithm; and FIG. 15 is a flowchart for explaining an example of encryption using part of a file common between nodes.

DESCRIPTION OF EMBODIMENTS

Figure 5A:
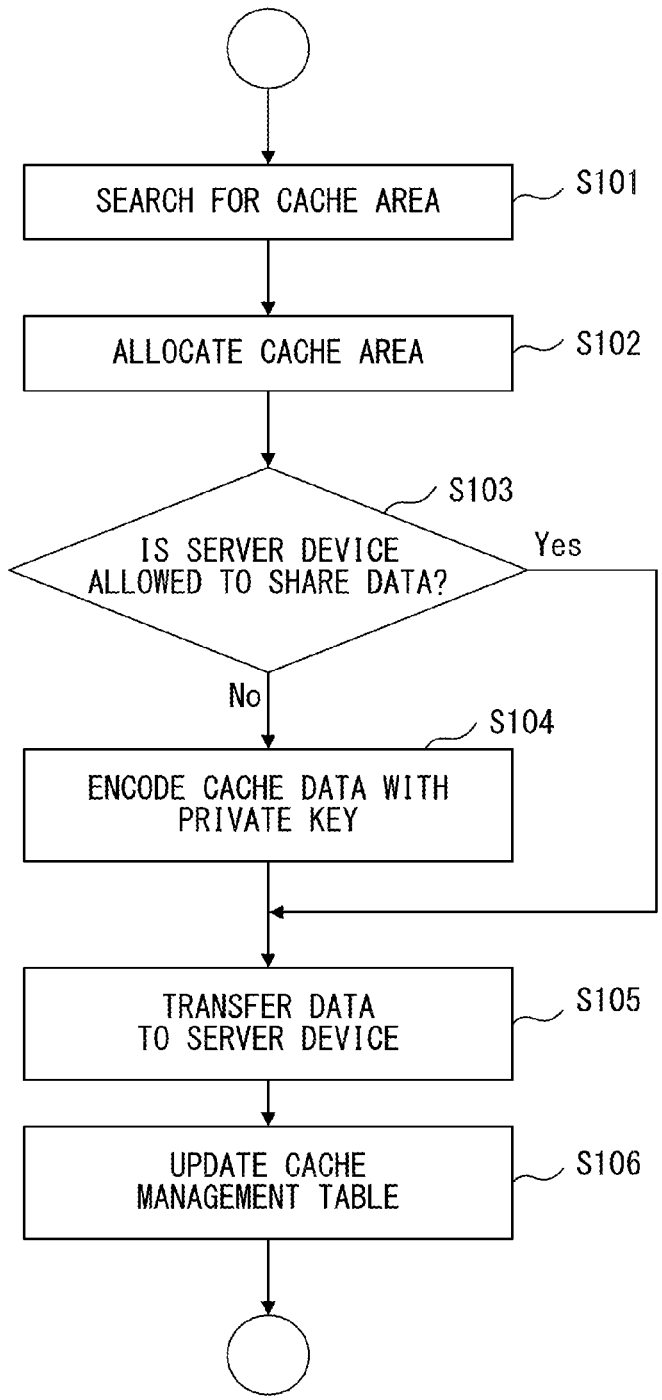
FIG. 5A is a flowchart for explaining an example of write processing of cache data.

From a viewpoint of cost, it is preferable that the number of servers introduced into a system is smaller. However, in a system in which the number of servers is smaller, it is more likely that the processing load on the server will become heavier.

Hereinafter, an embodiment is explained in detail with reference to the drawings.

FIG. 1 is a diagram for explaining an example (part 1) of a system according to the embodiment. A distributed file system 100 in FIG. 1 includes a client 110, a file server 120, a disk device 130, and a relay device 140. Further, the system according to the embodiment includes a cache server 300 not allowed to share data by the distributed file system 100. The relay device 140 is a device that relays communication between the client 110, the file server 120, and the cache server 300. The relay device 140 is implemented by a switch or a router.

The file server 120 is a server that manages data to be shared within the distributed file system 100. Data to be shared within the distributed file system 100 is held in the disk device 130 connected to the file server 120. The disk device 130 is a storage device that stores various kinds of data. In the example in FIG. 1, only the one disk device 130 is illustrated, but it may also be possible for the two or more disk devices 130 to be connected to the file server 120.

The disk device 130 holds file data 131. A memory 122 of the file server 120 has cache data 123, a private key 124, and a cache management table 125. The cache data 123 is data created in a cache area when the file data 131 is used. The private key 124 is a key used for encryption. The cache management table 125 includes information about managing cache data.

The cache server 300 according to the embodiment provides a cache area in order prevent accesses from the client 110 from concentrating in the file server 120.

Hereinafter, the operation of the distributed file system according to the embodiment is explained in order.

(A1) The client 110 transmits a request to use the file data 131 to the file server 120.

(A2) The file server 120 holds the cache data 123, which is a cache of the requested file data 131, in a cache area of the memory 122.

(A3) It is not possible for the cache server 300 to hold data that is not encrypted because of not being allowed to share data. Because of this, the file server 120 encrypts the cache data 123 by using the private key 124. The file server 120 transmits encrypted cache data 302 to the cache server 300. The cache server 300 stores the encrypted cache data 302 in a memory 301.

(A4) The file server 120 associates identification information of the encrypted cache data 302 and identification information of the server that holds the encrypted cache data 302, and causes the cache management table 125 to hold the associated information.

(A5) The file server 120 transmits the cache data 123 and the private key 124 to the client 110. The client 110 stores the cache data 123 and the private key 124 in a memory 111. Further, the file server 120 notifies the client 110 of the identification information of the server that holds the encrypted cache data 302.

(A6) The cache data 123 of the client 110 is updated according to circumstances within the client 110. The client 110 encrypts the cache data 123 after an update and transmits the encrypted cache data 302 to the cache server 300. The cache server 300 updates the encrypted cache data 302.

(A7) The cache server 300 transmits the encrypted cache data 302 to the file server 120 at a predetermined timing or in response to a request from the client 110.

(A8) The file server 120 decrypts the encrypted cache data 302 and updates the cache data 123.

(A9) At the predetermined timing, the file server 120 reflects the update of the cache data 123 also in the file data 131.

(A10) When the client 110 ends the use of the cache data 123, the client 110 notifies the file server 120 that the processing has been completed. The file server 120 acquires the encrypted cache data 302 from the cache server 300. The file server 120 deletes the encrypted cache data 302 from the cache server 300. The file server 120 decrypts the encrypted cache data 302 and reflects this in the file data 131.

In the processing in (A4), it may also be possible for the cache management table 125 to further hold the identification information of the encryption key in association with the identification information of the encrypted cache data 302. The processing in (A6) to (A9) may be performed repeatedly. The processing in (A6) and that in (A7) may be performed simultaneously or may be performed in the opposite order. The processing in (A1) to (A10) is performed by the CPU within each server.

The client 110 explained with reference to FIG. 1 no longer communicates with the file server 120 to update the file data 131 after the processing in the procedure (A5) and the subsequent processing. Because of this, it is unlikely that accesses will concentrate in the file server 120 even in the case of a plurality of the clients 110.

The cache server 300 according to the embodiment is not allowed to share data that is not encrypted by the distributed file system 100. Because of this, even in the case where the cache server 300 is added, it is not needed to perform the setting work for sharing data in the cache server 300. In the system according to the embodiment, by causing the server not allowed to share data that is not encrypted to hold encrypted cache information, it is possible to use the cache area of the server that is not capable of accessing the data of the distributed file system. The cache server 300 does not hold the private key 124, and therefore, it is not possible to read data in the encrypted cache information. Because of this, the security of data in the distributed file system is guaranteed.

The system according to the embodiment is just an example and the numbers of the clients 110, the file serves 120, the disk devices 130, and the cache servers 300 are not limited. The system may include a plurality of the clients 110, the file servers 120, the disk devices 130, and the cache servers 300.

FIG. 2 is a diagram for explaining an example of a hardware configuration of a client, a file server, and a cache server. The client, the file server, and the cache server include a processor 11, a memory 12, a bus 13, an external storage device 14, and a network connection device 15. Further, as an option, the client, the file server, and the cache server may include an input device 16, an output device 17, and a medium drive device 18. The client, the file server, and the cache server may sometimes be implemented by, for example, a computer etc.

The processor 11 may be formed as any processing circuit including a central processing unit (CPU). The processor 11 manages the client, the file server, and the cache within the cache server. Further, it is possible for the processor 11 to execute programs stored in, for example, the external storage device 14. The memory 12 stores the caches of data used by the client, the file server, and the cache server. Further, the memory 12 stores data obtained by the operation of the processor 11 and data used in the processing by the processor 11 according to circumstances. The network connection device 15 is used for communication with another device.

The input device 16 is implemented as, for example, a button, a keyboard, a mouse, etc., and the output device 17 is implemented as a display etc. The bus 13 connects the processor 11, the memory 12, the input device 16, the output device 17, the external storage device 14, the medium drive device 18, and the network connection device 15 so that data may be transmitted and received among them. The external storage device 14 stores programs, data, etc., and provides stored information to the processor 11 according to circumstances. It is possible for the medium drive device 18 to output the data of the memory 12 and the external storage device 14 to a portable storage medium 19 and further to read programs, data, etc., from the portable storage medium 19. Here, the portable storage medium 19 may be any portable storage medium, including a floppy disc, a magneto-optical (MO) disc, a compact disc recordable (CD-R), and a digital versatile disk recordable (DVD-R).

FIG. 3 is a diagram for explaining an example of encryption processing according to the embodiment. In FIG. 3, the same reference numerals are attached to the same components as those in FIG. 1. In the system in FIG. 3, data is managed by dividing the data into a plurality of blocks, unlike in FIG. 1 in which data is managed in units of files. Because of this, in the example of the system in FIG. 3, the file data 131 in FIG. 1 is divided into fblocks 201 (201a to 201d) and is stored in the disc device 130.

By a request from the client 110, the file server 120 causes the memory 122 to hold cblocks 211 (211a to 211d), which are cache data corresponding to the fblocks 201 (201a to 201d). The file server 120 encrypts the cblocks 211 by using an rblock 220, which is a private key, and transmits the encrypted cache data 310 to the cache server 300.

The rblock 220, which is a private key, is random data that is the same size as the fblock 201 etc. One rblock 220 is created for the file data 131. Because of this, in the example in FIG. 3, the rblock 220 is used in common by the fblocks 201 (201a to 201d). Encryption is performed by, for example, a method for calculating the exclusive OR of the cblock 211 and the rblock 220.

The cache management table 125 holds encrypted cache data 310, identification information of the private key, and identification information of a server holding the encrypted cache data 310 after associating them with one another for each divided block.

The private key does not need to use random data. For example, the private key may be the first block of the divided file data 131. In this case, the private key is the fblock 201a, which is the first block of the divided file data 131. In the system in which data of part of a file is used as a private key, when the data of the file is changed, the data of the block set as a private key is also changed. Then, a private key is generated newly triggered by the change in the file data.

When the file data has been changed, the file server requests all the servers having performed encryption by using the private key before the change to invalidate the key and the encrypted data. At this time, the file server selects the servers that the file server requests to perform invalidation by referring to the cache management table 125. After that, the file server generates a new private key. It may also be possible to update the private key that has been used by using the contents of the first block of the changed file data. Alternatively, it may also be possible to create a private key newly separately from the private key that has been used by using contents of the first block of the changed file data. Then, the file server allocates a new block corresponding to the changed block of the file data to another node.

By using part of a file as a private key, it is possible to hold the file and the private key with the original file size. Because of this, it is possible to reduce an amount needed by the memory and the amount of communication.

FIG. 4 is a diagram for explaining the example (part 2) of the system according to the embodiment. In FIG. 4, the same reference numerals are attached to the same components as those in FIG. 1. The distributed file system 100 in FIG. 4 further includes a cache server 150 in addition to those in the distributed file system 100 in FIG. 1. The cache server 150 is allowed by the distributed file system 100 to share data. On the other hand, the cache server 300 is not allowed by the distributed file system 100 to share data that is not encrypted, as in the example in FIG. 1.

In the following, the operation of the distributed file system in FIG. 4 is explained in order.

(B1) The client 110 transmits a request to use the file data 131 to the file server 120.

(B2) The file server 120 holds the cache data 123, which is the cache of the requested file data 131, in the cache area of the memory 122. Further, the file server 120 encrypts the cache data 123 by using the private key 124. The file server 120 holds the encrypted cache data 302 in the cache area of the memory 122.

(B3) The file server 120 selects the cache server 150 or the cache server 300 as the cache server used by the client 110. Here, the file server 120 selects the cache server so as to distribute the load as much as possible. Consequently, it may also be possible for the file server 120 to randomly select the cache server 150 or the cache server 300. Further, it may also be possible for the file server 120 to select the cache server 150 or the cache server 300 in order.

(B3-1) In the case where the cache server 300 is selected, the file server 120 transmits the encrypted cache data 302 to the cache server 300. The cache server 300 holds the encrypted cache data 302 in the memory 301. In the case where the cache server 300 is selected, the processing in (A4) to (A10) described in the first embodiment in FIG. 1 is performed.

(B3-2) In the case where the cache server 150 is selected, the file server 120 transmits the cache data 123 to the cache server 150. The cache server 150 holds the cache data 123 in a memory 151. In the case where the cache server 150 is selected, the processing in (B4) to (B9) below is performed.

(B4) The file server 120 holds the identification information of the cache data 123 and the identification information of the server that holds the cache data 123 in the cache management table 125 after associating them with each other.

(B5) The file server 120 transmits the cache data 123 to the client 110. The client 110 holds the cache data 123 in the memory 111. Further, the file server 120 notifies the client 110 of the identification information of the cache server that holds the cache data 123.

(B6) The cache data 123 of the client 110 is updated according to circumstances within the client 110. The client 110 transmits the cache data 123 after an update to the cache server 150. The cache server 150 updates the cache data 123 that the cache server 150 holds.

(B7) The cache server 150 transmits the cache data 123 to the file server 120 at a predetermined timing or in response to a request from the client 110.

(B8) The file server 120 also reflects the updating of the cache data 123 in the file data 131 at a predetermined timing.

(B9) When the client 110 ends the use of the cache data 123, the client 110 notifies the file server 120 that the processing has been completed. The file server 120 acquires the most recent cache data 123 from the cache server 150. The file server 120 deletes the cache data 123 from the cache server 150. The file server 120 also reflects the updating of the cache data 123 in the file data 131.

The selection of the cache server described in (B3) is just an example. Consequently, the processing in (B3) does not limit the load distribution method. The processing in (B6) to (B9) may be performed repeatedly. The processing in (B6) and that in (B7) may be performed simultaneously or may be performed in the opposite order. The processing in (B1) to (B9) is performed by the CPU within each server. In the case where (B3-1) is selected in the processing in (B3), the cache server 300 stores data holding the contents of the processing in the client until the update processing in the client 110 is completed. In the case where (B3-2) is selected, the cache server 150 stores data holding the contents of the processing in the client until the update processing in the client 110 is completed.

In the processing in (A5) described in the embodiment in FIG. 1 and in (B5), the client 110 is notified of the identification information of the cache server that holds the cache data 123. Here, the client 110 determines whether the notified cache server is the cache server 300 not allowed to share data or the cache server 150 allowed to share data. The client 110 holds in advance at least information on the server allowed to share data. In the embodiment in FIG. 1, the client 110 determines to use the cache server 300 not allowed to share data. On the other hand, in the embodiment in FIG. 4, the client 110 determines to use the cache server 150 allowed to share data.

The cache management table 125 in the system in FIG. 4 holds information in which the identification information of the cache data 123 and the identification information of the server that holds the cache data 123 are associated. Further, the cache management table 125 holds information in which the identification information of the encrypted cache data 302, the identification information of the server that holds the encrypted cache data 302, and the private key are associated. Furthermore, the cache server 150 and the client 110 may hold the private key 124 and the encrypted cache data 302.

In the processing in (B1) to (B9) in the embodiment in FIG. 4, the client 110 does not communicate with the file server 120 to update the file data 131. Because of this, even in the case of a plurality of the clients 110, it is unlikely that accesses will concentrate in the file server 120.

The system according to the embodiment is just an example and does not limit the numbers of the file servers 120, the disk devices 130, the cache servers 150, and the cache servers 300. It may also be possible for the system to include a plurality of the clients 110, the file servers 120, the disk devices 130, the cache servers 150, and the cache servers 300.

FIG. 5A is a flowchart for explaining an example of write processing of cache data. The file server selects a cache area to which cache data is written from the cache server (step S101). The file server allocates a cache area to which data is written (step S102). The file server determines whether the cache area to which data is written belongs to the cache server allowed to share data (step S103). The file server encrypts cache data with a private key (step S104, NO at step S103). The file server transfers data to the server that is the destination to which the data is written (step S105, YES at step S103). The file server updates the cache management table (step S106).

Figure 5B:
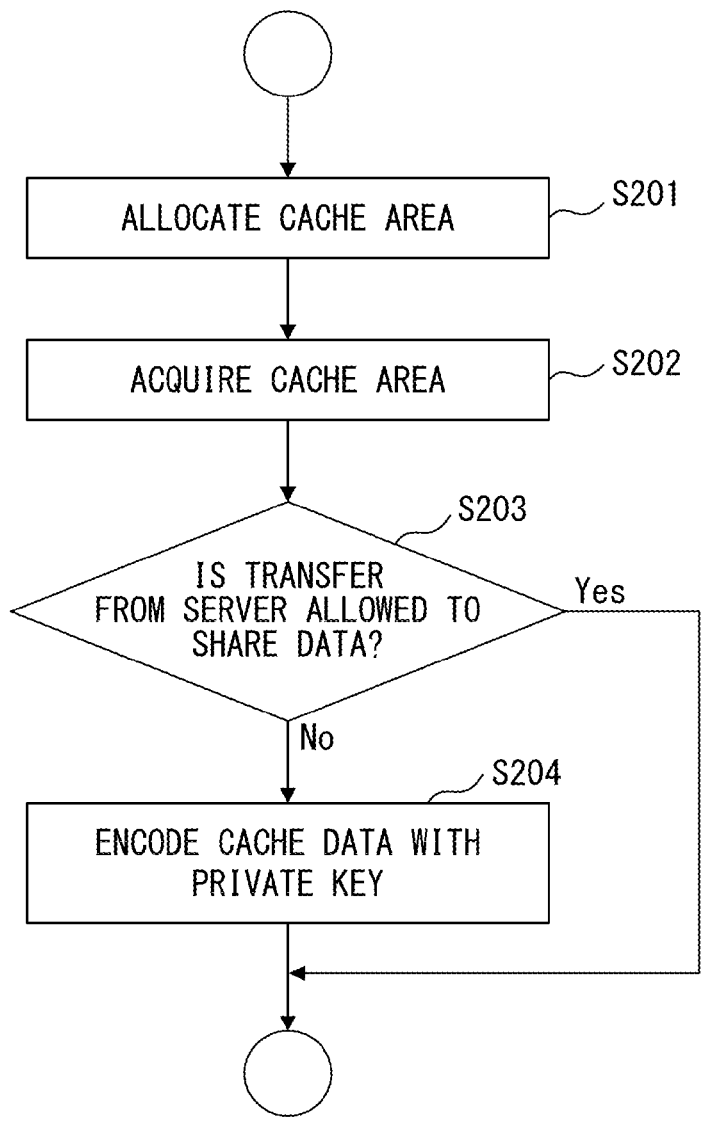
FIG. 5B is a flowchart for explaining an example of read processing of cache data.

FIG. 5B is a flowchart for explaining an example of read processing of cache data. The file server allocates a cache area for data that is transferred (step S201). The file server acquires cache data (step S202). The file server determines whether the acquired cache data is transferred from the cache server allowed to share data (step S203). The file server encrypts the acquired cache data with a private key (step S204, NO at step S203). The file server exits the read processing of cache data (YES at step S203).

The identification information of the cache server allowed to share data at S103 and S203 is determined by referring to the cache management table.

FIG. 6 is a flowchart for explaining an example of the processing in the system that uses part of the file data as a private key. The system that uses part of the file data as a private key is an example of the description of encryption in FIG. 3. The block used as a private key of the file data is referred to as a private key block and the block not used as a private key is referred to as a data block.

Figure 6A:
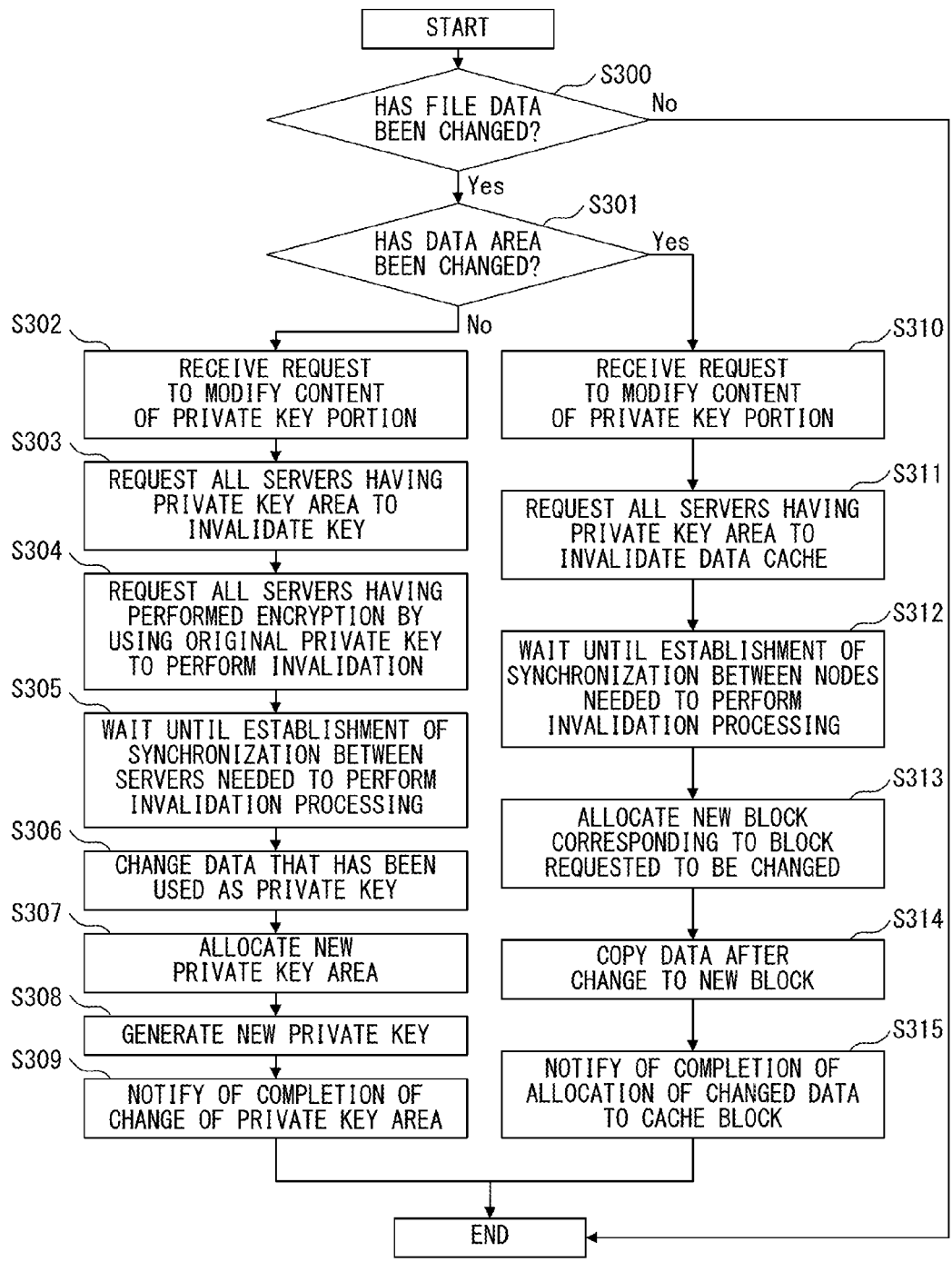
FIG. 6A is a flowchart for explaining an example of updating processing of a key accompanying a file data change.

FIG. 6A is a flowchart for explaining an example of the key update processing accompanying the file data change. The file server determines whether the file data has been changed (step S300). The file server determines whether the data block of the cache data excluding the private key block of the cache server or the client has been changed (step S301, YES at step S300). The file server receives a request to modify the private key block from the cache server or the client (step S302, NO at step S301). The file server transmits a request to invalidate the private key to all the servers holding the private key (step S303). The file server transmits a request to invalidate the encrypted data to all the servers holding the data encrypted with the private key requested to be modified (step S304). The file server stands by until the processing of each server in which invalidation processing is performed is completed (step S305). The file server updates the data of the private key block (step S306). The file server allocates an area for a private key in the memory area (step S307). The file server generates a new private key by using the data after the update (step S308). The file server notifies all the servers having been holding the private key before the update that a new private key has been generated (step S309).

The file server receives a request to modify the private key block from the cache server or the client (step S310, YES at step S301). The file server transmits a request to invalidate cache data to all the servers holding the private key (step S311). The file server stands by until the processing of each server in which invalidation processing is performed is completed (step S312). The file server allocates a new block area to all the servers having been requested to perform invalidation (step S313). The file server writes the data after the change to the new block area (step S314). The file server notifies all the servers to which the file server has transmitted the invalidation request that the update of the cache block has been completed (step S315). The file server exits the key update processing (NO at step S300).

The servers to which the invalidation request is output at S303, S308, S310, S312, etc., are determined by referring to the cache management table.

Figure 6B:
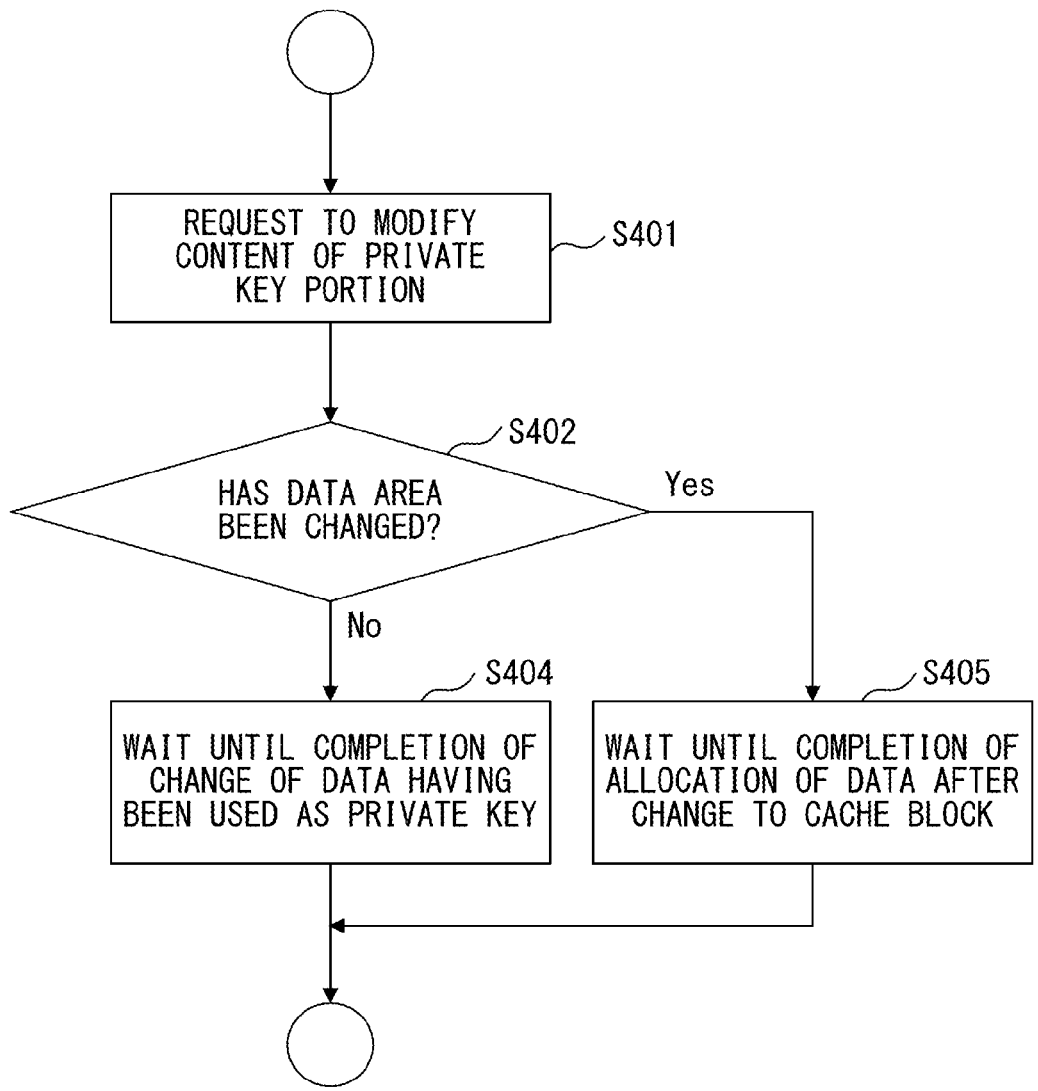
FIG. 6B is a flowchart for explaining an example of processing related to a file data update on the client side.

FIG. 6B is a flowchart for explaining an example of the processing related to the file data update on the client side. The client transmits a request to modify the private key block to the file server (step S401). The client determines whether the data block has been changed (step S402). The client waits until the change of the data, which has been the private key, is completed (step S404, NO at step S402). The client waits until it is notified that the update of the cache block has been completed (step S403, YES at step S402).

FIG. 6C is a flowchart for explaining the example of the processing related to the file data update on the client and the cache server sides. The client or the cache server receives the request to invalidate the encrypted cache data or the private key (step S501). The client or the cache server invalidates the cache data within the memory area and the private key, and notifies the device having made the request that invalidation has been completed (step S502). The client or the cache server determines whether the invalidation processing of the private key has been performed (step S503). The client or the cache server determines whether the private key block within the cache data has been changed (step S504, YES at step S503). The client or the cache server acquires a new private key from the new private key area of the file server (step S505, YES at step S504). The client or the cache server exits the processing (NO at step S503, NO at step S504).

FIG. 7 is a diagram for explaining an example of the system including a GPGPU. In FIG. 7, the same reference numerals are attached to the same components as those in FIG. 4. Each of the client 110, the cache server 150, the file server 120, and the cache server 300 has a GPGPU 113 and an IB-HCA 114.

The GPGPU (General Purpose Graphics Processing Unit) 113 is an accelerator core processor. The accelerator core processor is suitable to perform the same operation on a large amount of data. Because of this, in the system in FIG. 7, the processing of encryption and decryption is performed by the GPGPU 113 mounted separately from the CPU. The IB-HCA (InfiniBand-Host Channel Adapter) 114 is a communication device compatible with the GPGPU 113. Because the accelerator core processor can simultaneously perform a larger number of operations of the same kind on a larger amount of data than the CPU can, it is possible to use the accelerator core processor to increase the speed of the operation processing such as encryption and decryption.

FIG. 8 is a diagram for explaining the example (part 3) of the system according to the embodiment. In FIG. 8, the same reference numerals are attached to the came components as those in FIG. 4. The system in FIG. 8 further includes a internode data operation mechanism 160 in addition to those in the system in FIG. 4.

The internode data operation mechanism 160 performs processing of encryption and decryption separately from the CPU mounted in each server. The processing using the internode data operation mechanism 160 is explained by using FIG. 9.

Figure 9:
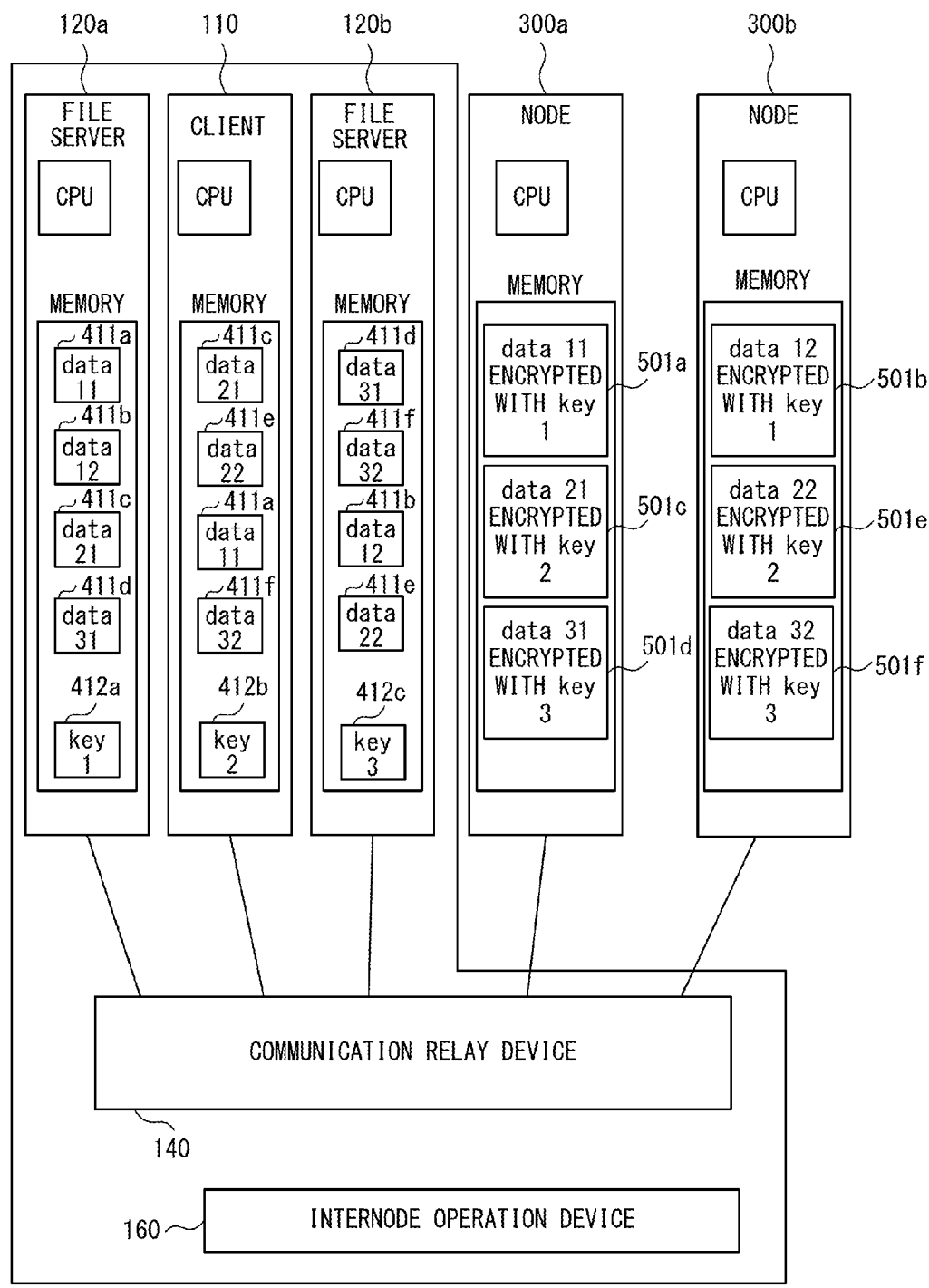
FIG. 9 is a diagram for explaining an example of processing using a internode data operation mechanism.

FIG. 9 is a diagram for explaining an example of the processing using the internode data operation mechanism. The distributed file system 100 in the system in FIG. 9 has the file servers 120 (120a, 120b), the client 110, the relay device 140, and the internode operation device 160. Further, the system according to the embodiment has the cache servers 300 (300a, 300b) not allowed to share data by the distributed file system 100.

The file server 120a holds cache data 411 (411a to 411d) and a private key 412a. The file server 120b holds the cache data 411 (411b, 411d, 411e, 411f) and a private key 412c. The client 110 holds the cache data 411 (411a, 411c, 411e, 411f) and a private key 412b. The private key 412a is a key used to encrypt the cache data 411a and the cache data 411b. The private key 412b is a key used to encrypt the cache data 411c and the cache data 411e. The private key 412c is a key used to encrypt the cache data 411d and the cache data 411f.

As an example, the processing performed by the internode operation device 160 in the case where the client 110 uses the cache data 411c is explained. In the system in FIG. 7, it is assumed that the cache data 411c has already been held in the client 110.

The file server 120a receives a request to use the cache data 411c from the client 110. The file server 120a acquires the private key 412b used to encrypt the cache data 411c from the client 110. The file server 120a performs processing to encrypt the cache data 411c with the private key 412b and transmits instructions to transfer the encrypted cache data to the cache server 300a to the internode operation device 160. At the same time, the file server 120a transmits the cache data 411c and the private key 412b to the internode operation device 160. The internode operation device 160 encrypts the cache data 411c with the private key 412b and transfers encrypted cache data 501c to the cache server 300a. The file server 120a notifies the client 110 that the encrypted cache data 501c has been transferred to the cache server 300a. The processing after that is the same as that in (A6) to (A10) in the embodiment in FIG. 1. The file server 120a manages the private key, the cache data, and the encrypted cache data by using the cache management table 125. The cache management table 125 holds the identification information of the private key, the identification information of the server holding the cache data, and the identification information of the server holding the encrypted cache data.

Next, the processing of the file server 120a to acquire the encrypted cache data 501c from the cache server 300 is explained. The file server 120a requests the client 110 to transmit the private key 412b to the internode operation device 160. At the same time, the file server 120a requests the cache server 300 to transmit the encrypted cache data 501c to the internode operation device 160. The file server 120a commands the internode operation device 160 to decrypt the encrypted cache data 501c and to transfer the decrypted data to the file server 120a. The internode operation device 160 decrypts the encrypted cache data 501c and transfers the decrypted data to the file server 120a.

In the case where the file server 120 acquires data that the file server 120 does not hold from another server, adjustment of timing etc. is performed according to circumstances in the internode operation device 160 etc. Further, such a method is used according to circumstances depending on the load situation of each node, the arrangement situation of data, etc.

FIG. 10 is a flowchart for explaining an example of the encryption and decryption processing using the internode operation device. The file server allocates a data area in the memory area (step S601). The file server transmits instructions to perform encryption and decryption processing and instructions to each server by one-to-many communication (step S602). The file server waits for a response to the instructions to transfer various kinds of data and to perform encryption and decryption processing (step S603).

<System Using Erasure Correcting Code>

FIG. 11 is a diagram for explaining an example of a system that uses erasure correcting code. It is possible for the system in FIG. 11 to prevent data from being lost in the control of cache data by using erasure correcting code. In the system in FIG. 11, redundant symbols of erasure correcting code are taken to be encrypted cache data. FIG. 11 is a diagram for explaining an example of encryption in the embodiment in FIG. 1 and FIG. 4. The communication between servers in the system in FIG. 11 is the same as that in FIG. 1 and FIG. 4.

The system in FIG. 11A has file servers 601 (601a to 601m), a switch 602, and cache servers 700 ($700_{(m+1)}$ to $700_{(\pi+k)}$).

The file server 601a has data-11 to data-1n in the cache area of the memory. The file server 601m has data-m1 to data-mn in the cache area of the memory. Here, m of the data-mn denotes a file m and n denotes an nth data block. Consequently, for example, data-1n is the nth data block of a plurality of blocks into which file data 1 is divided.

The cache server $700_{(m+1)}$ has code-11 to code-m1 in the cache area of the memory. The cache server $700_{(m+k)}$ has code-1k to code-mk in the cache area of the memory. The code is cache data obtained by encrypting data stored in the file server 601. Here, m of the code-mk denotes the file m and k denotes a kth redundant block. For example, the code-m1 is the first redundant block of the file data m.

The cache data denoted by the code-11 to code-mk is calculated by using the redundant block of erasure correcting code of the file data. For example, in the case where k is assumed to be 1 and the file data is divided into two blocks a and b, the redundant block of erasure correcting code is the exclusive OR for each bit, i.e., (a xor b). A set of {a, b, (a xor b)} is the erasure correcting code of {a, b}, which is the original data. The exclusive OR (a xor b) is cache data.

A block including k redundant symbols in certain erasure correcting code is held in the k different cache servers 700. Because of this, in the redundant block, even if one server fails, only one piece of data of the encrypted cache data of file data will be lost.

Figure 11B:
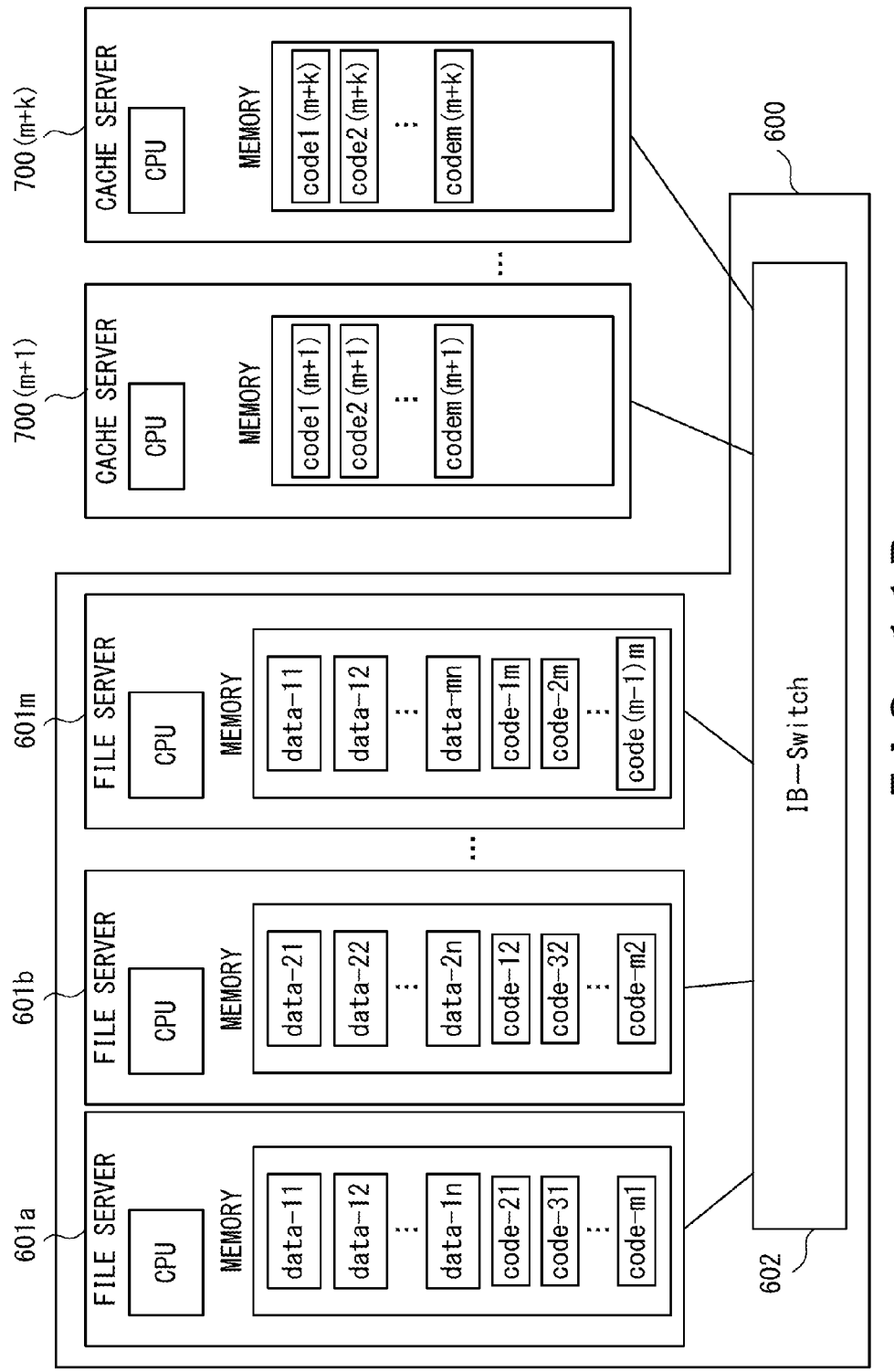
FIG. 11B is a diagram for explaining an arrangement example of cache data using erasure correcting code.

FIG. 11B is a diagram for explaining an arrangement example of cache data that uses erasure correcting code. In FIG. 11B, the same reference numerals are attached to the same components as those in FIG. 11A.

In the example in FIG. 11B, the file server 601a has the data-11 to data-1n in the cache area of the memory. Further, the file server 601a has the code-11 to code-m1 in the cache area of the memory. The file server 601m has the data-m1 to data-mn in the cache area of the memory. Further, the file server 601m has the code-1m to code-(m−1)m in the cache area of the memory.

The cache server $700_{(m+1)}$ has code-1(m+1) to code-m(m+1) in the cache area of the memory. The cache server $700_{(\pi+k)}$ has code-1(m+k) to code-m(m+k) in the cache area of the memory.

In the system in FIG. 11B, one file is divided into n files, and further the k redundant symbol blocks are arranged for the n symbols. In the case where the redundant blocks are multiplexed and then arranged, the memory area that is used is (1+k) times the size of the original data. On the other hand, as in FIG. 11B, it may also be possible to arrange (n+k) blocks in (n+k) nodes one by one. In this case, the memory area is (1+(k/n)) times that of the original data and the amount of memory that is used is smaller than that when the redundant blocks are multiplexed. Further, by also arranging the redundant block in the file server 601, it is possible to make an attempt to improve resistance against system failures. The symbol in the erasure correcting code used in the system in FIG. 11 corresponds to each bit field after data is divided into bit fields of a fixed length. The symbol is treated in association with the element of a finite field GF (q) by assuming the r-bit field as $q=2^r$. Further, for example, it may also be possible to associate the element of a finite field GF (q') with the symbol by assuming that $q'=p^s$ where p is a prime number and s is a natural number. In this case, the relationship will be q'>q.

It is possible to generate erasure correcting code by using the finite field GF (q). The erasure correcting code used in the system in FIG. 11 has a matrix or a set of column and row vectors of a matrix having the nature described below.

A matrix of n rows and (n+k) columns using the elements of the GF (q), and any n column vectors of the (n+k) column vectors are linearly independent.

A matrix of n rows and (n+k) columns using the elements of the GF (q), and any n row vectors of (n+k) row vectors are linearly independent.

The finite field GF (q) having the above-described nature is a matrix in which n original symbols can be restored from any n symbols of (n+k) symbols obtained by adding k redundant symbols to n symbols.

If there is a set T including (n+k) n-dimensional vectors on the finite field GF (q) having q elements and having the nature that vectors in a subset S including any n vectors are linearly independent, it will be possible to obtain erasure correcting code corresponding to the set T.

A (n, (n+k)) matrix in which elements in the set T are arranged is taken to be A.

A square matrix including the first n columns of A is taken to be B.

An inverse matrix of B is taken to be C.

A matrix C*A obtained by multiplying A by C is taken to be D.

By multiplying a vector in which blocks obtained by dividing the original data into n blocks are arranged by the matrix D, it is possible to obtain (n+k) blocks, which are erasure correcting code. The unit matrix including the first n columns of D corresponds to the blocks of the original data and the remaining columns correspond to the redundant symbols.

FIG. 12 is a diagram for explaining an example of data transfer in the system using erasure correcting code. The system in FIG. 12 has a relay node 701, a transmission node 702, a relay node 703, a reception node 704, a relay node 705, and a reception node 706. The system in FIG. 12 has the feature that in the case where the same cache data is transmitted to two or more nodes and further the path from a node from which the data is transmitted to a node to which the data is transmitted includes a node having three or more bandwidths, data converted into erasure correcting code is held by the relay node. A set of n blocks of equal length into which the original data is divided is taken to be S. The erasure correcting code used in the system in FIG. 12 has the nature that the entire original data can be restored if there are any n blocks in the set T of (n+k) blocks obtained by adding k redundant blocks of equal length to S. For example, in the case where n=2 and k=1, the exclusive OR will be erasure correcting code having the nature of being capable of restoring the entire original data.

A system 711 in FIG. 12 is an example of the case where the relay node is caused to hold data converted into erasure correcting code. In the example in FIG. 12, a and b are data after the data to be transmitted has been halved. The relay node 705 holds three kinds of data, i.e., a, b, and (a xor b). The relay node 705 in the system 711 in FIG. 12 is the node not having the right to share the data a and the data b.

The transmission node 702 transmits the data a to the relay node 701, the data (a xor b) to the relay node 705, and the data b to the relay node 703. The reception node 704 receives the data a from the relay node 701 and further receives the data (a xor b) from the relay node 705. It is possible for the reception node 704 to acquire the data a and the data b from the received data. The reception node 706 receives the data b from the relay node 703 and further receives the data (a xor b) from the relay node 705. It is possible for the reception node 706 to acquire the data a and the data b from the received data.

A system 712 to a system 714 are each an example of the system that does not use erasure correcting code. The relay node 705 in the system 712 to the system 714 in FIG. 12 is a node having the right to share the data a and the data b.

In the system of the system 712 in FIG. 12, the transmission node 702 transmits the data a to the relay node 701 and the data b to the relay node 703. The reception node 704 receives the data a from the relay node 701 and transmits the received data a to the relay node 705. On the other hand, the reception node 706 receives the data b from the relay node 703 and transmits the received data b to the relay node 705. The relay node 705 receives the data a from the reception node 704 and transmits the received data a to the reception node 706. At the same time, the relay node 705 receives the data b from the reception node 706 and transmits the received data b to the reception node 704. By the processing such as this, it is possible for the reception node 704 and the reception node 706 to acquire the data a and the data b.

In the system of the system 713 in FIG. 12, the transmission node 702 transmits the data a to the relay node 701, the data b to the relay node 703, and the data a to the relay node 705. The reception node 704 receives the data a from the relay node 701. The reception node 706 receives the data b from the relay node 703 and transmits the received data b to the relay node 705. The relay node 705 receives the data a from the transmission node 702 and transmits the received data a to the reception node 706. At the same time, the relay node 705 receives the data b from the reception node 706 and transmits the received data b to the reception node 704. By the processing such as this, it is possible for the reception node 704 and the reception node 706 to acquire the data a and the data b.

In the system of the system 714 in FIG. 12, the transmission node 702 transmits the data a to the relay node 701, the data a to the relay node 703, and the data b to the relay node 705. The relay node 705 receives the data b from the transmission node 702 and transmits the received data b to the reception node 704 and the reception node 706. The reception node 704 receives the data a from the relay node 701 and the data b from the relay node 705. The reception node 706 receives the data a from the relay node 703 and the data b from the relay node 705. By the processing such as this, it is possible for the reception node 704 and the reception node 706 to acquire the data a and the data b.

It is possible for the relay node 705 in the system 711 in FIG. 12 to use the node not having the right to share the data a and the dada b unlike that in the system 712 to the system 714 in FIG. 12. Clearly, the system 711 in FIG. 9 has implemented a transfer efficiency higher than that of the system 712 and the system 713 in FIG. 12. The system 711 in FIG. 9 and the system 714 in FIG. 9 are in an environment where it is recommended that erasure correcting code be used, or in both the systems, it is recommended that an optimum transfer efficiency be calculated by taking into consideration the transmission cost etc.

Figure 13:
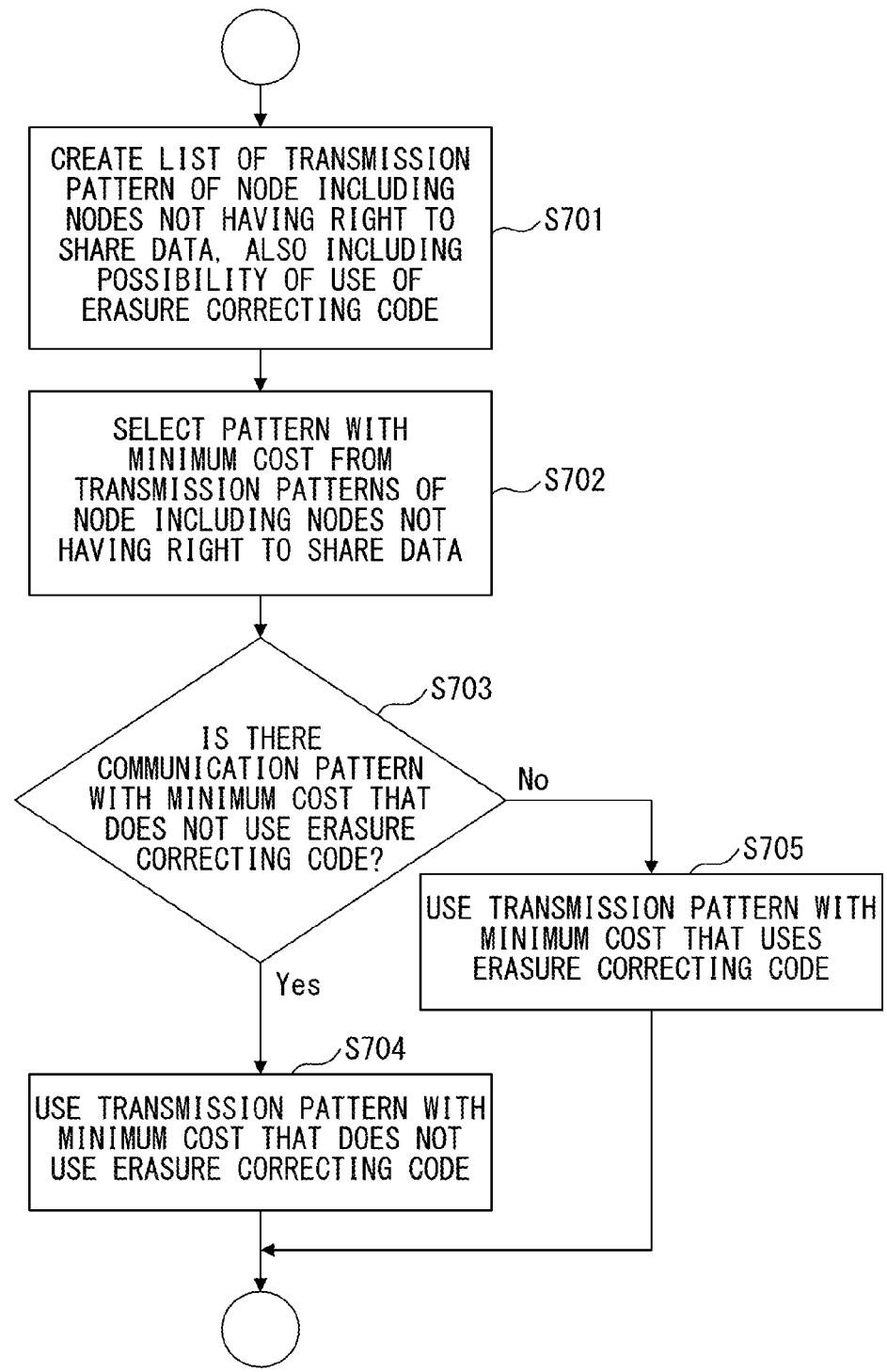
FIG. 13 is a flowchart for explaining processing to select a transfer route.

FIG. 13 is a flowchart for explaining processing to select a transfer route. The transmission node, including the nodes not having the right to share data, collects information on the pattern of the route through which transmission is performed whether or not erasure correcting code is used (step S701). The transmission node selects a pattern with the minimum cost from among the patterns (step S702). The transmission node determines whether a pattern not using erasure correcting code has been selected (step S703). The transmission node uses a pattern not using erasure correcting code (step S704, YES at step S703). The transmission node uses a pattern with the minimum cost which uses erasure correcting code (step S705, NO at step S703).

<System Using Dictionary-Type Compression Algorithm>

FIG. 14 is a flowchart for explaining an example of encryption by the dictionary-type compression algorithm. In a system in which the contents of a block of part of a file are used for encryption of the file, the compression algorithm referred to as the dictionary type may be used. In the dictionary-type compression algorithm, the contents of a block of whole or part of a file are subjected to lossless compression and cache data is generated by encrypting a portion that does not include the private key. FIG. 14 is a diagram for explaining an example of encryption in the embodiments in FIG. 1 and FIG. 4. Because of this, in the system using the dictionary-type compression algorithm, the communication between servers is the same as that in FIG. 1 and FIG. 4.

From the viewpoint of security, compression alone is insufficient, and therefore, in the case where a server not having the right to access a file is caused to hold cache data, it is preferable to simultaneously use an encryption method other than compression.

The node performs lossless compression of a file to be encrypted by the dictionary-type compression method (step S801). The node transmits a block of a file including a dictionary portion to the cache of a sever having the right to access a file (step S802). The node determines whether to create a private key used by encryption means other than compression (step S803). The node generates a private key (step S804, YES at step S803). The node encrypts a file by using the generated private key (step S805). The node arranges the encrypted cache data in a server not having the right to access a file (step S806). The node exits the processing (after step S806 ends, NO at step S803).

<System Using Encryption that Uses Part of a File in Common Between Nodes>

FIG. 15 is a flowchart for explaining an example of encryption that uses part of a file in common between nodes. FIG. 15 is a diagram for explaining an example of encryption in the embodiments in FIG. 1 and FIG. 4. Because of this, in the system in which part of a file in common between nodes is used for encryption, the communication between servers is the same as that in FIG. 1 and FIG. 4. In the case where a file is arranged in a node having the right to access a file to be shared, as a private key, part of another file in common between those nodes may be used.

The node holding file data determines whether there exists an in-common file between the nodes of the transmission destination of the encrypted cache data (step S901). The node selects one block from the in-common file (step S902, YES at step S901). The node uses the selected block as a private key (step S903). The node generates a private key that does not depend on another file (step S904, NO at step S901). The node exits the processing (after step S903 ends, and after step S904 ends).

The node used in the explanation in FIG. 14 and FIG. 15 may be either of the file server and the client server.

All examples and conditional language provided herein are intended for the pedagogical purposes of aiding the reader in understanding the invention and the concepts contributed by the inventor to further the art, and are not to be construed as limitation to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising:
    a first information processing device that holds data and a key used to encrypt the data;
    a client device that uses the data;
    a second information processing device that does not have a right to share, or a right to access, data that is not encrypted with the first information processing device and the client device, and
    a third information processing device having a right to share data that is not encrypted with the first information processing device and the client device, wherein
    the first information processing device:
        upon receipt of a request to use the data from the client device, the first information processing device:
        specifies one of the second information processing device and the third information processing device, whichever has a lighter load, as a communication target, which will be the information processing device that the client device communicates with when use of the data ends;
        notifies the client device of identification information of the communication target;
        transmits the data and the key to the client device upon receipt of a request from the client device, wherein the request is transmitted when the client device uses the data; and
        generates first encrypted data, which is the data encrypted with the key, and transmits the first encrypted data to the communication target;
    the client device:
    in a case where the received identification information of the communication target is identification information of the second information processing device, transmits a second encrypted data obtained by encrypting a result of processing on the data with the key to the second information processing device when use of the data ends, the second information processing device updates the first encrypted data stored in a cache area within the second information processing device, using the second encrypted data; and
    in a case where the received identification information of the communication target is identification information of the third information processing device, transmits the second encrypted data to the third information processing device when the use of the data ends, the third information processing device stores the second encrypted data in a cache area within the third information processing device; and
    the first information processing device acquires the second encrypted data, which is a most recent data that the second or third information processing device has received from the client device, decrypts the second encrypted data, and stores the decrypted data when notified by the client device that the use of the data has ended.

2. The information processing system according to claim 1, wherein the client device has identification information of a device having a right to share data that is not encrypted, and
    the client device determines that the third information processing device has been specified as the communication target in a case where the received identification information of the communication target is identification information of the device having the right to share data that is not encrypted.

3. A control method of an information processing system comprising:
    holding, by a first information processing device, data and a key used to encrypt the data;
    using, by a client device, the data;
    a second information processing device not having a right to share, or a right to access, data that is not encrypted with the first information processing device and the client device, and
    a third information processing device having a right to share data that is not encrypted with the first information processing device and the client device, wherein
    the first information processing device:
        transmitting the data and the key to a client device upon receipt of a request from the client device, wherein the request is transmitted when the client device uses the data;
        specifying one of the second information processing device and the third information processing device, whichever has a lighter load, as a communication target, which will be the information processing device that the client device communicates with when use of the data ends;
        notifying the client device of identification information of the communication target;
        transmitting the data and the key to the client device upon receipt of a request from the client device, wherein the request is transmitted when the client device uses the data; and
        generating first encrypted data, which is the data encrypted with the key, and transmitting the first encrypted data to the communication target;
    the client device:
    in a case where the received identification information of the communication target is identification information of the second information processing device, transmits a second encrypted data obtained by encrypting a result of processing on the data with the key to the second information processing device when use of the data ends, the second information processing device updates the first encrypted data stored in a cache area within the second information processing device, using the second encrypted data; and
    in a case where the received identification information of the communication target is identification information of the third information processing device, transmits the second encrypted data to the third information processing device when the use of the data ends, the third information processing device stores the second encrypted data in a cache area within the third information processing device; and the first information processing device acquires the second encrypted data, which is a most recent data that the second or third information processing device has received from the client device, decrypts the second encrypted data, and stores the decrypted data when notified by the client device that the use of the data has ended.

4. The control method of an information processing system according to claim 3, wherein the client device has identification information of a device having a right to share data that is not encrypted, and the client device determines that the third information processing device has been specified as the communication target in a case where the received identification information of the communication target is identification information of the device having the right to share data that is not encrypted.

5. A non-transitory computer-readable recording medium having stored therein a control program for causing an information processing device to perform a process comprising:

holding, by a first information processing device, data and a key used to encrypt the data;

using, by a client device, the data;

a second information processing device not having a right to share, or a right to access, data that is not encrypted with the first information processing device and the client device, and a third information processing device having a right to share data that is not encrypted with the first information processing device and the client device, wherein the first information processing device:

transmitting the data and the key to a client device upon receipt of a request from the client device, wherein the request is transmitted when the client device uses the data;

specifying one of the second information processing device and the third information processing device, whichever has a lighter load, as a communication target, which will be the information processing device that the client device communicates with when use of the data ends;

notifying the client device of identification information of the communication target;

transmitting the data and the key to the client device upon receipt of a request from the client device, wherein the request is transmitted when the client device uses the data; and generating first encrypted data, which is the data encrypted with the key, and transmitting the first encrypted data to the communication target;

the client device:

in a case where the received identification information of the communication target is identification information of the second information processing device, transmits a second encrypted data obtained by encrypting a result of processing on the data with the key to the second information processing device when use of the data ends, the second information processing device updates the first encrypted data stored in a cache area within the second information processing device, using the second encrypted data; and in a case where the received identification information of the communication target is identification information of the third information processing device, transmits the second encrypted data to the third information processing device when the use of the data ends, the third information processing device stores the second encrypted data in a cache area within the third information processing device; and the first information processing device acquires the second encrypted data, which is a most recent data that the second or third information processing device has received from the client device decrypts the second encrypted data, and stores the decrypted data when notified by the client device that the use of the data has ended.

* * * * *